United States Patent
Kawashima et al.

[11] Patent Number: 6,086,178
[45] Date of Patent: Jul. 11, 2000

[54] INK DETECTION FOR PRINTERS AND SCANNERS

[75] Inventors: Shunji Kawashima, Wako; Minoru Yokoyama, Yokohama; Yuji Nakano, Kawasaki; Naohiro Iwata, Yokosuka; Hideyuki Terashima, Sagamihara, all of Japan

[73] Assignee: Canon Kabushiki Kaisha, Tokyo, Japan

[21] Appl. No.: 08/664,573

[22] Filed: Jun. 17, 1996

[30] Foreign Application Priority Data

| Jun. 19, 1995 | [JP] | Japan | 7-151482 |
| Jun. 19, 1995 | [JP] | Japan | 7-151483 |
| Jul. 17, 1995 | [JP] | Japan | 7-180354 |

[51] Int. Cl.$^7$ ................................. B41J 2/195
[52] U.S. Cl. .................. 347/7; 347/3; 347/23
[58] Field of Search ................. 347/7, 19, 37, 347/22, 23, 30, 2, 3

[56] References Cited

U.S. PATENT DOCUMENTS

| 4,313,124 | 1/1982 | Hara ........................... 347/57 |
| 4,345,262 | 8/1982 | Shirato et al. ............... 347/10 |
| 4,383,263 | 5/1983 | Ozawa et al. ............... 347/30 |

(List continued on next page.)

FOREIGN PATENT DOCUMENTS

| 443245 | 8/1991 | European Pat. Off. . |
| 0573274 | 12/1993 | European Pat. Off. . |
| 593292 | 4/1994 | European Pat. Off. . |
| 0709208 | 5/1996 | European Pat. Off. . |
| 3408302 | 9/1985 | Germany . |
| 60-071260 | 4/1960 | Japan . |
| 54-056847 | 5/1979 | Japan . |
| 54-56847 | 5/1979 | Japan . |
| 54-133373 | 10/1979 | Japan . |
| 56-144184 | 11/1981 | Japan . |
| 56-144185 | 11/1981 | Japan . |
| 57-51474 | 3/1982 | Japan . |
| 59-123670 | 7/1984 | Japan . |
| 59-138461 | 8/1984 | Japan . |
| 59-194853 | 11/1984 | Japan . |
| 60-31021 | 2/1985 | Japan . |
| 60-56561 | 4/1985 | Japan . |
| 60-71260 | 4/1985 | Japan . |
| 60-090767 | 5/1985 | Japan . |
| 60-115451 | 6/1985 | Japan . |
| 60-172546 | 9/1985 | Japan . |
| 60-253552 | 12/1985 | Japan . |
| 61-086265 | 5/1986 | Japan . |
| 62-021549 | 1/1987 | Japan . |
| 62-156965 | 7/1987 | Japan . |
| 62-209317 | 9/1987 | Japan . |
| 63-252747 | 10/1988 | Japan . |
| 63-295266 | 12/1988 | Japan . |
| 64-17489 | 1/1989 | Japan . |
| 64-20148 | 1/1989 | Japan . |
| 64-21049 | 1/1989 | Japan . |
| 1092621 | 4/1989 | Japan . |
| 1-120352 | 5/1989 | Japan . |
| 2-78557 | 3/1990 | Japan . |
| 2102061 | 4/1990 | Japan . |
| 3-247456 | 11/1991 | Japan . |
| 5278228 | 10/1993 | Japan . |
| 7087287 | 3/1995 | Japan . |
| 7-89090 | 4/1995 | Japan . |
| 92/18335 | 10/1992 | WIPO . |

*Primary Examiner*—John Barlow
*Assistant Examiner*—Craig A. Hallacher
*Attorney, Agent, or Firm*—Fitzpatrick, Cella, Harper & Scinto

[57] ABSTRACT

A printer that performs high-precision residual-ink detection regardless of various movements accompanying print operation and facsimile apparatus using the printer. When an ink cartridge reciprocates along a main-scanning direction, ink surface of ink 91 varies depending on a moving direction and moving condition (stationary state, uniform motion, accelerated motion and decelerated motion) of the ink cartridge. Accordingly, the residual-ink detection is controlled such that a residual-ink amount can be detected by using photosensor 11 and reflection board 93, at the same detection timing (e.g., always at timing of uniform motion).

48 Claims, 13 Drawing Sheets

U.S. PATENT DOCUMENTS

| | | | |
|---|---|---|---|
| 4,459,600 | 7/1984 | Sato et al. | 347/47 |
| 4,463,359 | 7/1984 | Ayata et al. | 347/56 |
| 4,558,333 | 12/1985 | Sugitani et al. | 347/65 |
| 4,608,577 | 8/1986 | Hori | 347/66 |
| 4,631,556 | 12/1986 | Watanabe et al. | 347/30 |
| 4,723,129 | 2/1988 | Endo et al. | 347/56 |
| 4,740,796 | 4/1988 | Endo et al. | 347/56 |
| 5,068,806 | 11/1991 | Gatten | 358/1.14 |
| 5,070,346 | 12/1991 | Mochizuki et al. | 347/7 |
| 5,216,450 | 6/1993 | Koitabashi et al. | 347/87 |
| 5,250,957 | 10/1993 | Onozato | 346/1.1 |
| 5,406,315 | 4/1995 | Allen et al. | 347/7 |
| 5,414,452 | 5/1995 | Accatino et al. | 347/7 |
| 5,596,351 | 1/1997 | Stapleton | 347/7 |
| 5,606,353 | 2/1997 | Mochizuki et al. | 347/23 |
| 5,631,674 | 5/1997 | Shinada et al. | 347/37 |
| 5,657,057 | 8/1997 | Nakajima et al. | 347/7 |
| 5,680,521 | 10/1997 | Pardo et al. | 395/112 |
| 5,712,667 | 1/1998 | Sato | 347/7 |
| 5,900,888 | 5/1999 | Kurosawa | 347/7 |

INK DETECTION FOR PRINTERS AND SCANNERS

BACKGROUND OF THE INVENTION

This invention relates to a printing apparatus and facsimile apparatus using the printing apparatus and, more particularly to a printing apparatus that performs printing in accordance with an ink-jet printing method and facsimile apparatus using the printing apparatus.

Conventionally, printers that perform printing in accordance with an ink-jet printing method employ various techniques as described below to detect the amount of residual ink in their ink tank.

Japanese Patent Application Laid-Open No. 2-102061 discloses a reflective type photosensor, with a reflection board provided in an ink tank, to detect shortage of ink. In Japanese Patent Application Laid-Open No. 56-144184, to avoid degradation of detection precision due to ripples of the ink surface, ink shortage status is notified after a predetermined period from detection of the status.

Further, a control method utilizing a photo-interruptive type sensor with an electrode provided in an ink tank is known. An electric signal which varies in accordance with change of residual-ink amount is obtained from the sensor, and if it is determined in accordance with the detected signal that the ink is exhausted, immediately print operation is stopped.

However, in the above conventional art, since a photosensor is used for the residual-ink detection, temporary impingement of external light such as sunlight or intense spot light on a photoreceptor of an residual-ink detection sensor causes erroneous determination of ink shortage.

Further, for the residual ink detection, to detect a photosensor output, the above prior art uses a circuit which requires adjustment due to fluctuation of the sensor output, the secular change of sensor characteristic, and variation in sensing mechanism, which exceed allowable values. Further, as the ink cartridge itself trembles due to vibration of the apparatus or the like, noise may be mixed in the residual-ink detection, otherwise, the sensor output varies due to ripples of the ink surface, thus degrading the precision of residual-ink detection.

Further, the conventional residual-ink detecting technique has a drawback that it cannot detect status where the ink is completely exhausted. For example, as a typical conventional art, in an ink tank containing a sponge at an internal portion for preventing ink leakage, ink is first supplied to the sponge from an ink reservoir portion, and the ink is supplied to a printhead from the sponge fully containing the ink. In this ink tank, the amount of ink contained in the sponge cannot be detected by the aforementioned techniques.

Accordingly, in the above control method, since the print operation is stopped even when ink remains in the sponge, the residual ink in the sponge cannot be used for printing.

To solve this problem, an apparatus which performs print control so as to perform ink discharge while counting the number of dots after it is determined that ink is exhausted, and continue printing until the counted number of dots becomes a predetermined value (this is referred to as "further-discharging control"), has been proposed.

However, this construction cannot be applied to an apparatus having a suction-recovery mechanism that performs periodical or intermittent sucking on nozzles by a pump or the like to prevent ink clogging, unless the amount of ink consumed by this suction recovery is considered.

SUMMARY OF THE INVENTION

Accordingly, it is an object of the present invention to provide a printing apparatus capable of residual-ink detection with high precision regardless of, e.g., trembles of ink surface or external noise.

According to one aspect of the present invention, the foregoing object is attained by providing a printer which scans a printhead, discharges ink from the printhead, and performs printing on a printing medium, comprising: scan means for scanning the printhead; an ink tank, integrated with the printhead, containing the ink, being scanned by the scan means; detection means for detecting an amount of residual ink in the ink tank; and timing control means for controlling detection timing of the detection means such that residual-ink detection of the amount of residual ink during scanning of the printhead and the ink tank can always be made on the same detection condition.

It is another object of the present invention to provide a facsimile apparatus using the above printing apparatus.

According to another aspect of the present invention, the foregoing object is attained by providing a facsimile apparatus using the printer claimed in claim 1, comprising: communication means for performing transmission and reception of an image signal via a communication line; and memory means for temporarily storing the image signal.

It is still another object of the present invention to provide a method for detecting the residual-ink in an ink tank used in the above printer.

According to still another aspect of the present invention, the foregoing object is attained by providing a residual-ink detection method in a printer which scans a printhead integrating an ink tank, discharges ink from the printhead, and performs printing on a printing medium, comprising: a scan step of scanning the printhead; a detection step of detecting an amount of residual ink in the ink tank; and a timing control step of controlling detection timing at the detection step such that residual-ink detection of the amount of residual ink during scanning of the printhead and the ink tank can always be made on the same detection condition.

In accordance with the present invention as described above, upon printing by discharging ink on a printing medium while scanning the printhead, the amount of ink within an ink tank, that contains the ink and that moves integrally with the printhead, is detected. The detection timing is controlled such that detection condition is always the same during the scanning of the printhead and the ink tank.

It is still another object of the present invention to provide a printing apparatus capable of printing efficiently using ink by performing suction recovery, residual-ink detection and further-discharge control.

According to still another aspect of the present invention, the foregoing object is attained by providing a printer which performs printing on a printing medium by discharging ink from a printhead, comprising: an ink tank for containing the ink; detection means for detecting an amount of residual ink in the ink tank; suction means for sucking the ink in the printhead; evaluation means for evaluating an ink-discharge amount in printing by the printhead; and print control means for, after it is determined in residual-ink detection by the detection means that the ink is exhausted, stopping the printing by the printhead, in accordance with the ink-discharge amount evaluated by the evaluation means and an ink-consumption amount in suction by the suction means.

It is still another object of the present invention to provide a facsimile apparatus using the above printing apparatus.

According to still another aspect of the present invention, the foregoing object is attained by providing a facsimile apparatus using the above printer, comprising: communication means for performing transmission and reception of an image signal via a communication line; memory means for temporarily storing the image signal.

In accordance with the present invention as described above, upon printing using the print means for performing printing by discharging ink on a printing medium from the printhead, the residual-ink amount in the ink tank that contains the ink is detected, and in printing after determination in accordance with the detection result that the ink is exhausted, print operation by the print means is stopped, in accordance with an ink-discharge amount in the printing by the printhead, evaluated by evaluation means, and an ink-consumption amount in the suction recovery by the suction means.

It is still another object of the present invention to provide a printing apparatus capable of more accurate residual-ink detection and appropriate print control.

According to still another aspect of the present invention, the foregoing object is attained by providing a printer which scans a printhead, discharges ink from the printhead, and performs printing on a printing medium, comprising: scan means for scanning the printhead; an ink tank, integrated with the printhead, containing the ink, being scanned by the scan means; detection means for detecting an amount of residual ink in the ink tank; and print control means for controlling printing by the printhead, in accordance with the result of residual-ink detection by the detection means, wherein if it is determined in the residual-ink detection by the detection means that the ink is exhausted, at first time, the print control means performs first print operation, but if it is determined in the residual-ink detection by the detection means that the ink remains, at second time, the print control means performs second print operation.

It is still another object of the present invention to provide a facsimile apparatus using the above printing apparatus.

According to still another aspect of the present invention, the foregoing object is attained by providing a facsimile apparatus using the above printer, comprising: communication means for performing transmission and reception of an image signal via a communication line; and memory means for temporarily storing the image signal.

In accordance with the present invention as described above, upon printing by discharging ink on a printing medium while scanning the printhead, the amount of ink within an ink tank, that contains the ink and that reciprocates integrally with the printhead, is detected. Even if it is determined that the ink is exhausted at a first time and the first print operation is performed, if it is determined that the ink remains at a second time, the second print operation is performed.

In the embodied mode of the above described aspects of the present invention, after it is determined that ink is exhausted, an ink-discharge amount in printing and an ink-consumption amount in suction recovery after the determination can be accumulated.

Further, in the above print control, immediately after print operation after it is determined that ink is exhausted, the accumulated ink-consumption amount is compared with a first threshold value, or immediately after suction recovery after it is determined that the ink is exhausted, the accumulated ink-consumption amount is compared with a second threshold value. Note that the first threshold value is less than the second threshold value. The accumulated ink-consumption amount is reset at a point where it is determined that the ink remains. The ink-discharge amount and the ink-consumption amount are respectively converted into the number of dots for printing by discharging ink by the printhead.

Further, detection timing can be controlled such that the condition for residual-ink detection is always one of stationary state, accelerated motion, decelerated motion, or uniform motion in scanning of the printhead and the ink tank. Otherwise, the residual-ink detection may be performed on all detection conditions, stationary state, accelerated motion, decelerated motion, and uniform motion in scanning of the printhead and the ink tank, and all the detection results may be totally considered to reach a final detection result of the residual-ink detection.

More specifically, for the residual-ink detection, a photo sensor having a light-emitting device with a photoreceptor, and a reflection board that reflects light from the light-emitting device are employed. The photosensor and the reflection board are set such that the light-emission direction of the light-emitting device and the reflection direction of the reflection board correspond to the scanning direction of the printhead and the ink tank by the scan means, and the reflection surface of the reflection board is opposite to the light-emitting device. Further, the reflective-type photosensor is in contact with an exterior side wall of the ink tank, and the reflection board is provided in the ink tank.

Note that the printhead is a printhead that utilizes thermal energy for discharging ink and comprises thermal-energy transducers for generating thermal energy to be supplied to the ink.

Further, the present invention can be applied to a facsimile apparatus by using the printing apparatus having the above construction, comprising communication means for transmission/reception of image signals via a communication line, and memory means for temporarily storing the image signals.

The present invention is particularly advantageous since, for example, even if the ink surface ripples by scanning movement of the ink tank, residual-ink detection can be performed always at the same timing, i.e., at the same status of the ink surface. This enables residual-ink detection with high precision.

Also, according to another aspect of the present invention, printing under more effective further-discharge control can be performed.

Moreover, according to still another aspect of the present invention, even if it is erroneously detected at a first time that ink is exhausted, if it is determined, upon residual-ink detection at a second time, that ink remains, the first determination is considered as erroneous determination, and normal print operation can be restored. For example, the residual-ink detection may not be accurately performed depending upon where the apparatus is installed, due to, e.g., exposure of sunlight for a particular period. In such case, in accordance with the result of the next residual-ink detection, normal print operation can be restored. Further, multiple residual-ink detections can improve precision or reliability of residual-ink detection.

Other features and advantages of the present invention will be apparent from the following description taken in conjunction with the accompanying drawings, in which like reference characters designate the same name or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

<Structure of Apparatus (FIGS. 1 to 5)>

Mechanical Structure

Figure 1:
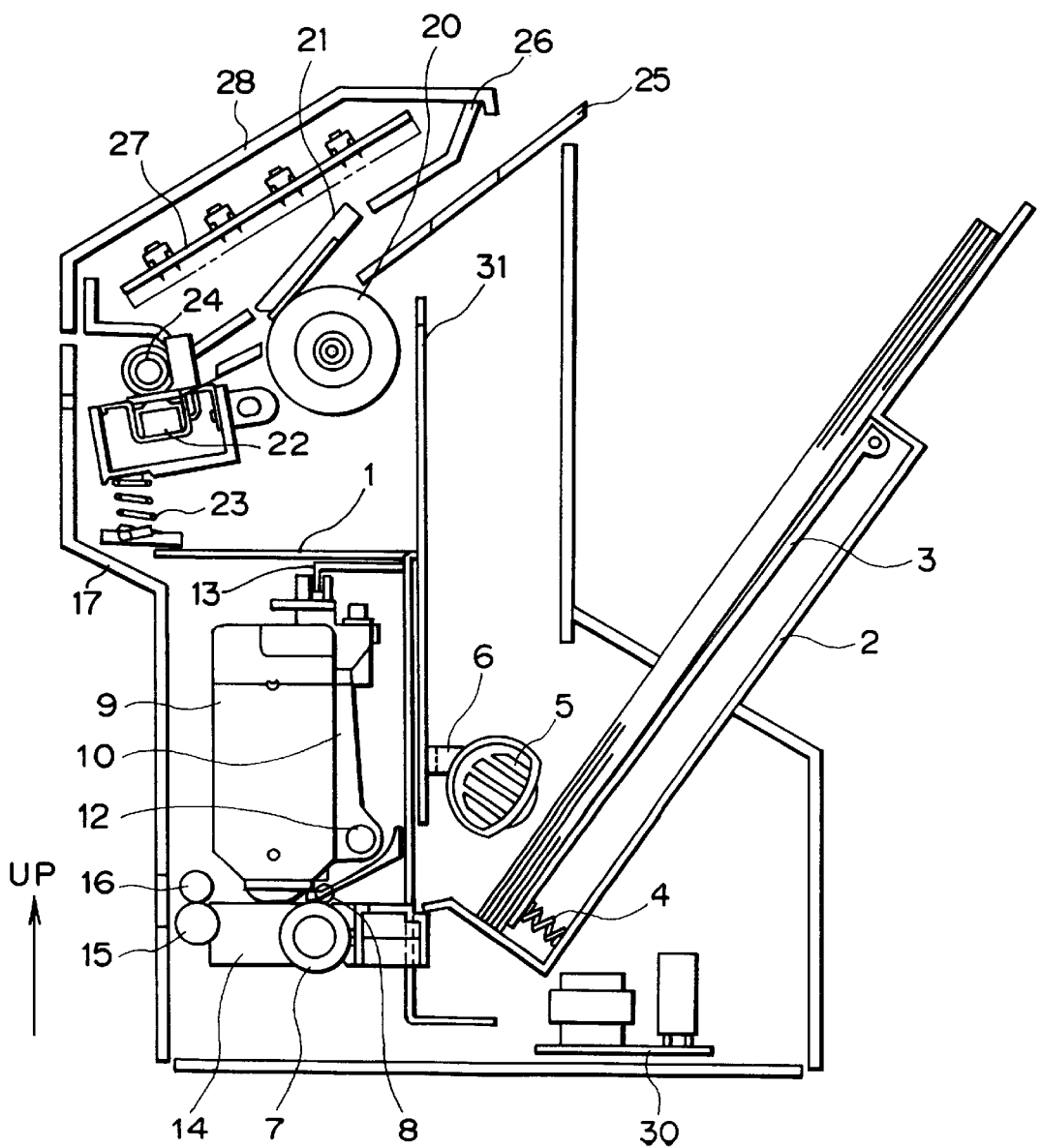
FIG. 1 is a cross-sectional view showing the mechanical structure of a facsimile apparatus having a printing unit in accordance with an ink-jet printing method, as a typical embodiment of the present invention.

FIG. 1 is a cross-sectional view showing the mechanical structure of a facsimile apparatus having a printing unit in accordance with an ink-jet printing method, as a typical embodiment of the present invention.

First, the construction of the printing unit of the facsimile apparatus will be described.

In FIG. 1, reference numeral 1 denotes a frame (main frame) as a main constituent of the overall apparatus; 2, an ASF (Auto Sheet Feeder) chassis attached to the frame 1, as a cassette of the ASF for holding plural print sheets and feeding the sheets into the printing unit one by one; 3, an intermediate board rotatably attached to the ASF chassis 2; and 4, a spring for biasing the intermediate board 3 upward in a clockwise direction; 5, a print-sheet separation roller which rotates in the clockwise direction by a mechanically driven unit (not shown); and 6, a photo-interruptive type sensor (hereinafter referred to as "roller-position sensor") for detecting a home position of the print-sheet separation roller 5.

It should be noted that the position of the intermediate board 3 in FIG. 1 corresponds to a stand-by status where it is pivoted in a counterclockwise direction and stopped by a cam (not shown) provided in the mechanically driven unit (not shown), controlling the movement of the intermediate board 3. When the cam is disengaged, the intermediate board 3 rotates in the clockwise direction, and the intermediate board 3 or the print sheet comes into contact with the outer circumferential portion of the print-sheet separation roller 5. Further, the movement of the intermediate board 3 and the position of an aspherical portion of the print-sheet separation roller 5 are in synchronization with each other.

Numeral 7 denotes a print-sheet convey roller which rotates in the counterclockwise direction by the mechanically driven unit (not shown); and 8, a print-sheet convey rod, provided around the print-sheet convey roller 7, in contact with the print-sheet convey roller 7 by a spring (not shown). The print-sheet convey roller 7 and the print-sheet convey rod 8 clamp the print sheet at a position where they are in contact with each other, and convey the print sheet in the leftward direction in FIG. 1 (hereinafter referred to as "subscanning direction"). Numeral 9 denotes an exchangeable (disposable) type ink cartridge integrating a printhead in accordance with the ink-jet printing method and an ink tank as an ink reservoir; and 10, a carriage to which the ink cartridge 9 is detachably attached.

The printing surface of the ink cartridge 9 is at the bottom part of the ink cartridge 9 in FIG. 1, and it has a plurality of nozzles arrayed in a transverse direction, forming the printing-surface. Upon printing, the ink cartridge 9 is moved in an orthogonal direction to the nozzle arrangement direction (i.e., vertical direction with respect to the figure; hereinafter referred to as "main-scanning direction"). Printing on a printing area for print width is performed by selectively discharging ink from those nozzles. Thereafter, the print sheet is shifted by the print width in the subscanning direction. Thus printing is made on the print sheet by repeating this printing operation (This printing method is called a "multiscan method"). A residual-ink detection sensor (ink sensor), comprising a photosensor, is attached to the carriage 10, for detecting the amount of residual ink in the ink cartridge 9. The detection direction of the ink sensor is approximately the same as the main-scanning direction of the ink cartridge 9. Since the ink sensor is attached to the carriage 10, the ink sensor moves with the ink cartridge 9 as the carriage 10 moves. Note that this movement will be described in detail later.

Numerals 12 and 13 denotes guide rails for assisting the reciprocating movement of the carriage 10 in the main-scanning direction. The carriage 10 is attached to these guide rails 12 and 13 movably in the main-scanning direction, and is reciprocated by the mechanically driven unit (not shown). Numeral 14 denotes a platen, opposing to the printhead, for holding the print sheet to face the printhead, and maintaining the distance from the print sheet to the printhead at the printing position. Numeral 15 denotes a paper discharge roller; and 16, a paper discharge rod. The paper discharge rod 16 is biased by a press member (not shown) against the paper discharge roller 15. The paper discharge roller 15 and the paper discharge rod 16 hold discharge the print sheet while holding the print sheet at a contact portion between them. Numeral 17 denotes a cover (print-sheet cover) which opens downward with a bottom portion of the apparatus as its pivotal axis.

Next, the construction of a reading unit of the facsimile apparatus will be described.

Numeral 20 denotes a reading separation roller which rotates in the counterclockwise direction by the mechanically driven unit (not shown) and conveys each of plurality of originals in the leftward direction in FIG. 1 one by one; 21, a separation piece, comprising of high-friction material such as rubber, biased by a press member (not shown) against the reading separation roller 20, for separating the plurality of originals one by one; 22, a contact type line image sensor (hereinafter referred to as "image sensor") which reads images on the originals and converts the read image information into electric signals; 23, a CS spring; and 24, a white CS roller which rotates in the clockwise direction by the mechanically driven unit (not shown). The CS spring 23 presses the image sensor 22 against the CS roller 24. The CS roller 24 brings the original into tight contact with the entire reading surface of the image sensor 22, conveys the original in the leftward direction in FIG. 1, and functions as a background in original reading.

Numeral 25 denotes an original guide, fixed to the frame 1 that supports (as a part of the apparatus body) the reading unit and an operation panel (described later), for guiding the back surface of the original; 26, an original guide, fixed to the original guide 25, for guiding the front surface of the original; 27, an operation circuit board having operation switches; and 28, the operation panel, to which the operation circuit board 27 is fixed. The operation panel 28 itself is fixed to the original guide 25.

Numeral 30 denotes a power unit comprising a power transformer, a capacitor and the like; and 31, an electric control board, attached to the frame 1, for controlling the operation of the overall apparatus. The electric control board 31 is connected with all wires and cables from electric devices, divided into the respective parts, components (the image sensor 22, the operation circuit board 27, the power unit 30, the ink cartridge 9, respective drive motors (not shown), the roller position sensor 6, and respective sensors (not shown)). Note that various sensors including a sensor for detecting presence/absence of print sheet, which are not described here, are directly integrated onto the electric control board 31 without using wires and cables. Further, all the external interfaces (e.g., a public telephone line network interface, an auxiliary sub-telephone interface, an external sub-telephone interface, and a personal-computer interface such as a centronics interface) are connected to the electric control board 31.

Figure 2:
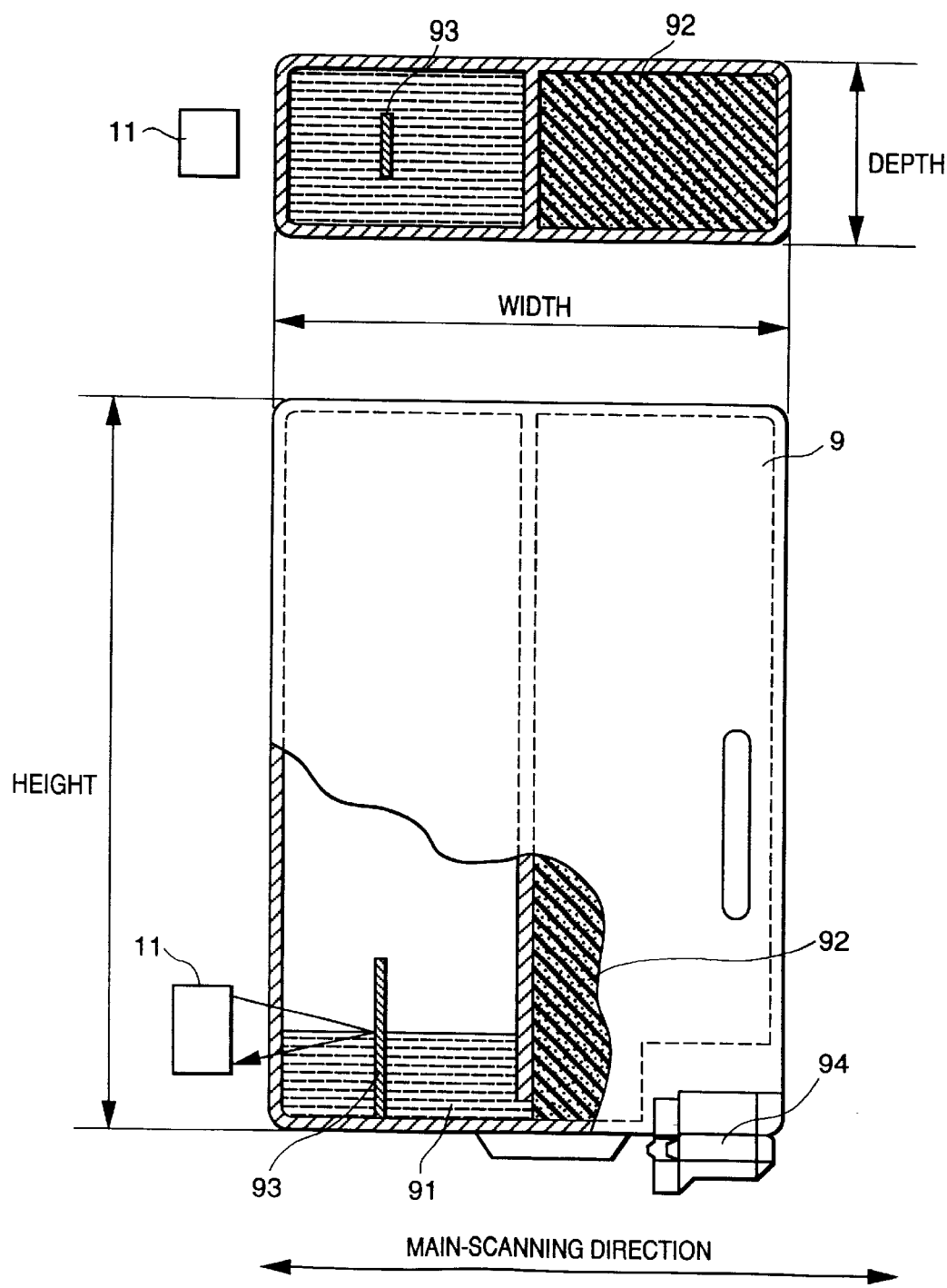
FIG. 2 is a partial-cutaway view showing the detailed construction of an ink cartridge 9.

FIG. 2 is a partial-cutaway view showing the detailed construction of the ink cartridge 9. In FIG. 2, numeral 11 denotes a reflection type photosensor (hereinafter referred to as "photosensor"); 91, ink; 92, a sponge; 93, a reflection board for reflecting light from the photosensor 11; and 94, a printhead. FIG. 2 especially shows status where the carriage 10 and the ink cartridge 9 to be mounted on the carriage 10 stand still. Accordingly, the surface of the ink 91 is smooth without ripples.

It is apparent from FIG. 2, the reflection board 93 is provided around the bottom of the ink cartridge, at a position near a ink-cartridge side wall, around which the photosensor 11 for the reflection board 93 is provided. This arrangement of the reflection board 93 around the photosensor 11 is intended to enhance the intensity of reflected light to be received by the photosensor 11, and improve S/N ratio in residual-ink detection. The interval (detection gap) between ink-cartridge side wall on the photosensor 11 side and the reflection board 93 is set, in consideration of the ink-surface tension and the water repellent relation among the side wall, the ink, and the reflection board, so as not to gather ink between the photosensor 11 and the side wall. This interval should preferably be 2 to 4 mm for more accurate residual-ink detection.

Further, right space and left space with respect to the reflection board 93 provided as above are not separate reservoirs but are connected. In other words, as shown in FIG. 2, the depth of the reflection board 93 does not occupy the full depth of the ink cartridge 9 but occupies a part of the depth of the ink cartridge 9. That is, the reflection board 93 is positioned around the central portion of the depth. This arrangement renders the same change to the ink surface between the reflection board 93 and the photosensor 11 as that to the ink surface of the ink within other parts of the ink cartridge. In addition to this arrangement, a hole may be provided around the bottom of the reflection board 93 to obtain the same level of the ink surface, on the both sides, around the reflection board 93.

When the ink cartridge 9 is filled up with the ink 91, the photosensor 11 hardly detects light reflected from the reflection board 93 since the light is interrupted by the ink 91. At this time, the output current from the photosensor 11 is approximately zero. On the other hand, when the ink cartridge has little or no ink 91, the photosensor 11 detects the light reflected from the reflection board 93, and as a result, outputs current corresponding to the reflection light intensity.

Electrical Construction

Figure 3:
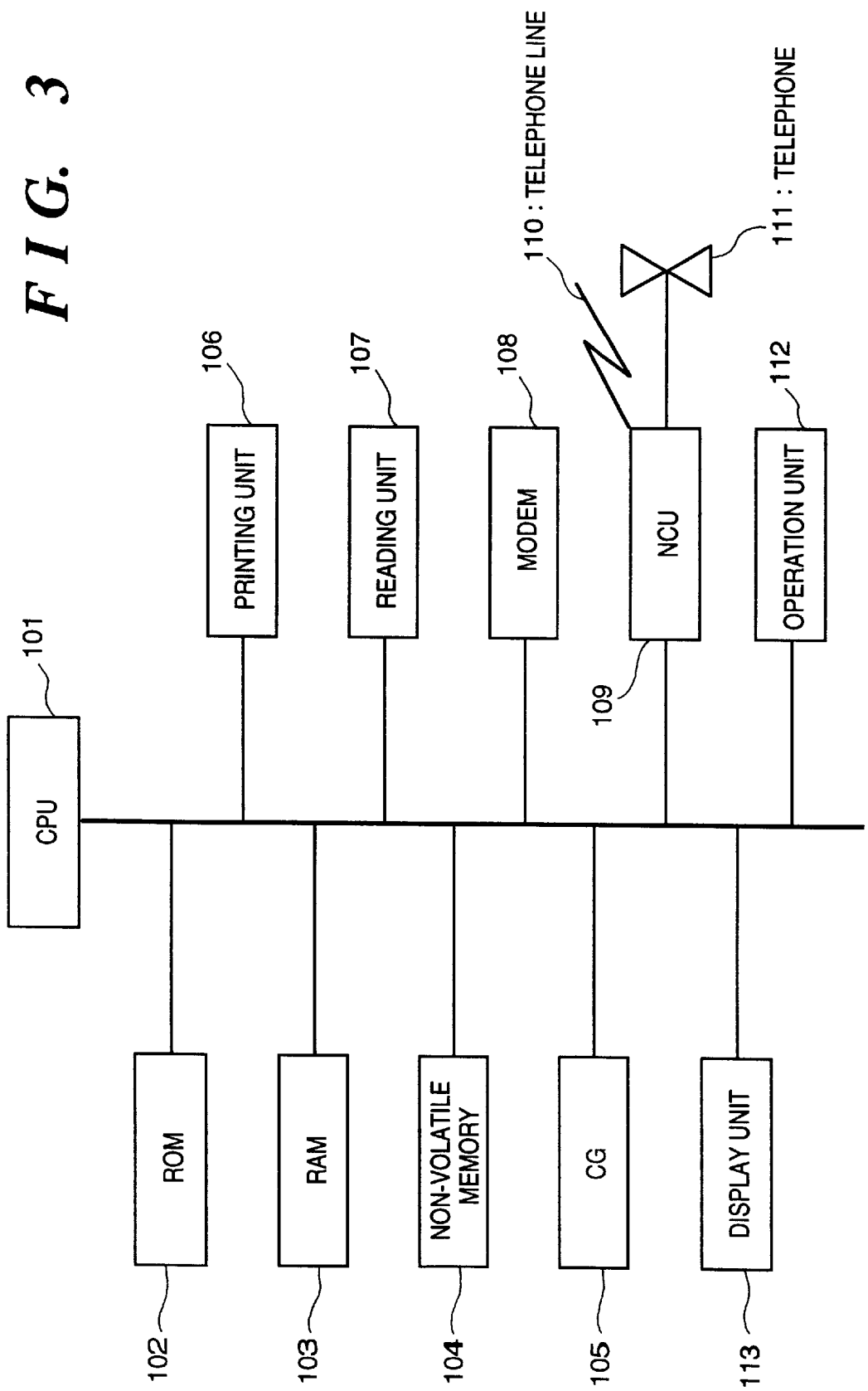
FIG. 3 is a block diagram showing the electrical construction of the facsimile apparatus in FIG. 1.

FIG. 3 is a block diagram showing the electrical construction of the facsimile apparatus in FIG. 1. In FIG. 3, numeral 101 denotes a CPU comprising a microprocessor or the like; 102, a ROM for storing control programs and processing programs executed by the CPU 101; 103, a RAM used as a storage area for storing image data for facsimile transmission/reception or read image data for copying processing and as a work area for the CPU 101 to execute the control programs and the processing programs; 104, a non-volatile memory comprising of a DRAM or an SRAM having a backup power source, or an EEPROM, for storing information even not supplied with power from the power unit 30.

Numeral 105 denotes a character generator (CG) which generates character patterns in accordance with character codes, represented based on a code system such as JIS codes or ASCII codes; 106, the printing unit having the construction as described in FIG. 1; 107, the reading unit having the construction as described in FIG. 1; 108, a MODEM; 109, a network control unit (NCU); 110, a telephone line; 111, a telephone; 112, an operation unit having a part of the operation panel 28 of the operation circuit board 27, as described in FIG. 1; and 113, a display unit having an LCD, LEDs and the like, with a part of the operation panel 28 of the operation circuit board 27, as described in FIG. 1.

The CPU 101 controls the ROM 102, the RAM 103, the non-volatile memory 104, the CG 105, the printing unit 106, the reading unit 107, the MODEM 108, the NCU 109, the operation unit 112, and the display unit 113.

The RAM 103 is used for storing binary image data read by the reading unit 107 or binary image data to be printed by the printing unit 106. Also, the RAM 103 is used for storing encoded image data to be modulated by the MODEM 108 and outputted onto the telephone line 110 via the NCU 109, and encoded image data obtained from demodulating, via the NCU 109 and the MODEM 108, an analog image signal received via the telephone line 110. The non-volatile memory 104 is used for storing data to be held regardless of presence/absence of power supply (e.g., abbreviated telephone numbers). The CG 105 generates character pattern data corresponding to input codes in accordance with necessity, under the control of the CPU 101.

The electric circuit of the printing unit 106, comprising a DMA controller, the ink-jet printhead, a CMOS logic IC and the like, reads the image data stored in the RAM 103, and print-outputs the data. On the other hand, the electric circuit of the reading unit 107, comprising a DMA controller, an image processing IC, an image sensor, a CMOS logic IC and the like, binarizes the image data read from the image sensor 22 and sequentially outputs the binary data to the RAM 103, under the control of the CPU 101. Note that the status of an original which is set with respect to the reading unit 107 can be detected by an original detection unit (not shown) using a photosensor provided on an original convey path.

The MODEM 108, comprising a G3/G2 MODEM, a clock generator connected to the MODEM and the like, modulates encoded transmission data stored in the RAM 103 and outputs the data onto the telephone line 110 via the NCU 109, otherwise, inputs, via the NCU 109, an analog image signal received via the telephone line 110, demodulates the input signal to obtain encoded received data, and stores the data into the RAM 103, under the control of the CPU 101. The NCU 109 switches the connection of the telephone line 110 to the MODEM 108 or to the telephone 111, under the control of the CPU 101. The NCU 109 has a detection circuit for detecting a calling signal (CI). When the calling signal is detected, the NCU 109 sends an incoming-call signal to the CPU 101.

The telephone 111 is integrated with the facsimile apparatus main body, comprising a handset, a speech network, a dialer, ten-keys, single-touch keys and the like. The operation unit 112 comprises a start key to start image transmission/reception, a resolution selection key to switch resolution of the facsimile image upon transmission/reception to fine mode, standard mode and the like, a mode selection key to designate operation mode upon automatic reception and the like, ten-keys and single-touch keys for dialing, and the like. The display unit 113 comprises an LCD module including a seven-segmented LCD for time display, an iconic LCD for displaying icons representing various modes, a matrix LCD for displaying 5×7 dots (one character)×one line, LEDs, and the like.

Next, the electrical construction of a residual-ink detection unit provided at the printing unit 106 will be described.

Figure 4:
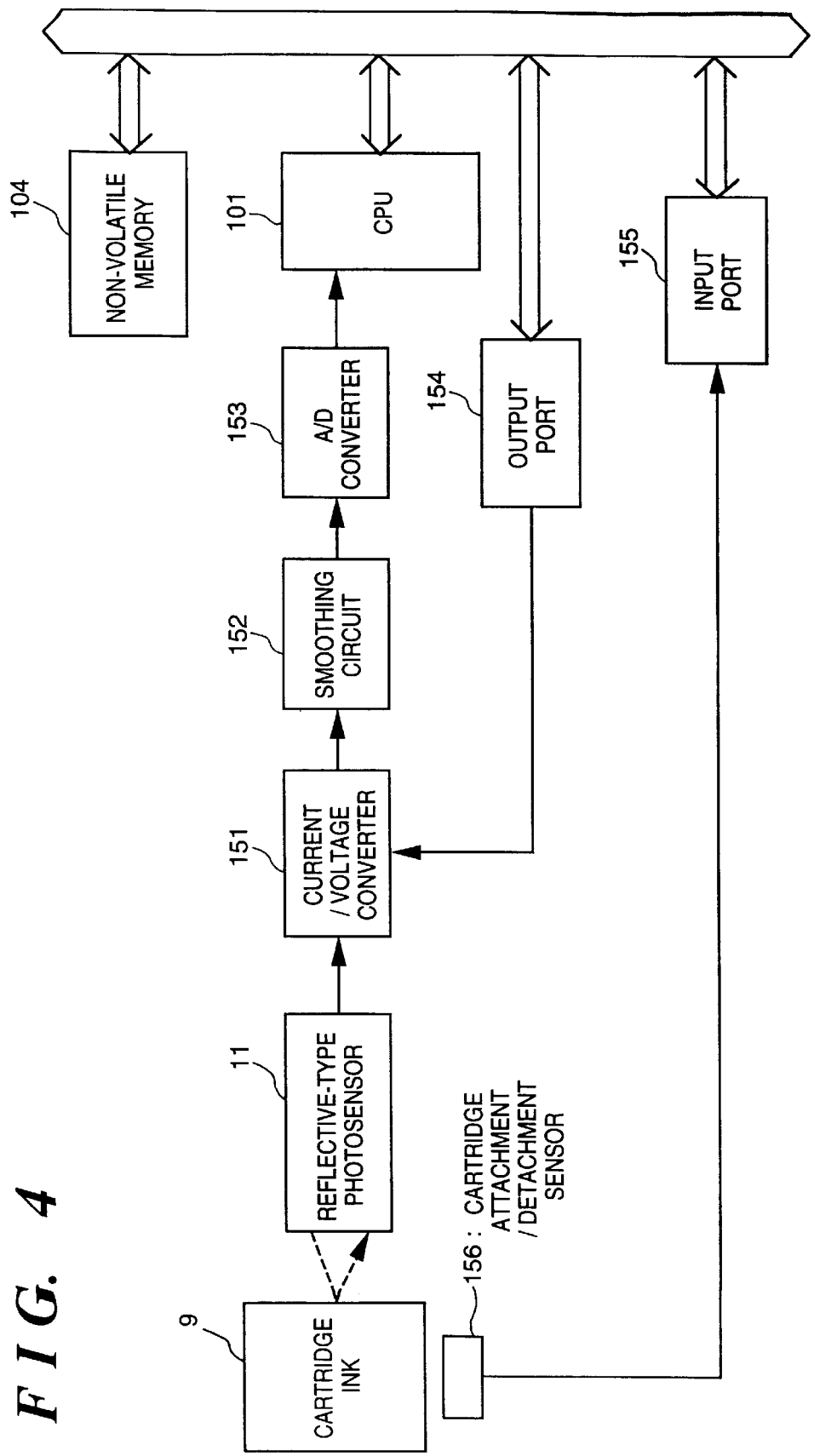
FIG. 4 is a block diagram showing the electrical construction of a residual-ink detection unit.

FIG. 4 is a block diagram showing the electrical construction of the residual-ink detection unit.

In FIG. 4, numeral 151 denotes a current/voltage converter for converting current into a voltage corresponding to the intensity of the output current from the photosensor 11; 152, a smoothing circuit which eliminates noise caused by the movement of the ink cartridge 9, and minimizes variation in output voltage due to ripples of the ink surface also caused by the movement of the ink cartridge 9; 153, an A/D converter; 154, an output port for supplying a switching signal (described later) to the current/voltage converter 151 in accordance with a control signal from the CPU 101; 155, an input port to input outputs from various sensors and output the signals to the CPU 101; and 156, a cartridge attachment/detachment sensor for detecting whether the ink cartridge 9 is attached to the carriage 10 or not. Note that the current/voltage converter 151 can vary the ratio of current/voltage conversion by the switching signal from an external device (CPU 101), and the output from the A/D converter 153 is inputted into the CPU 101.

Figure 5:
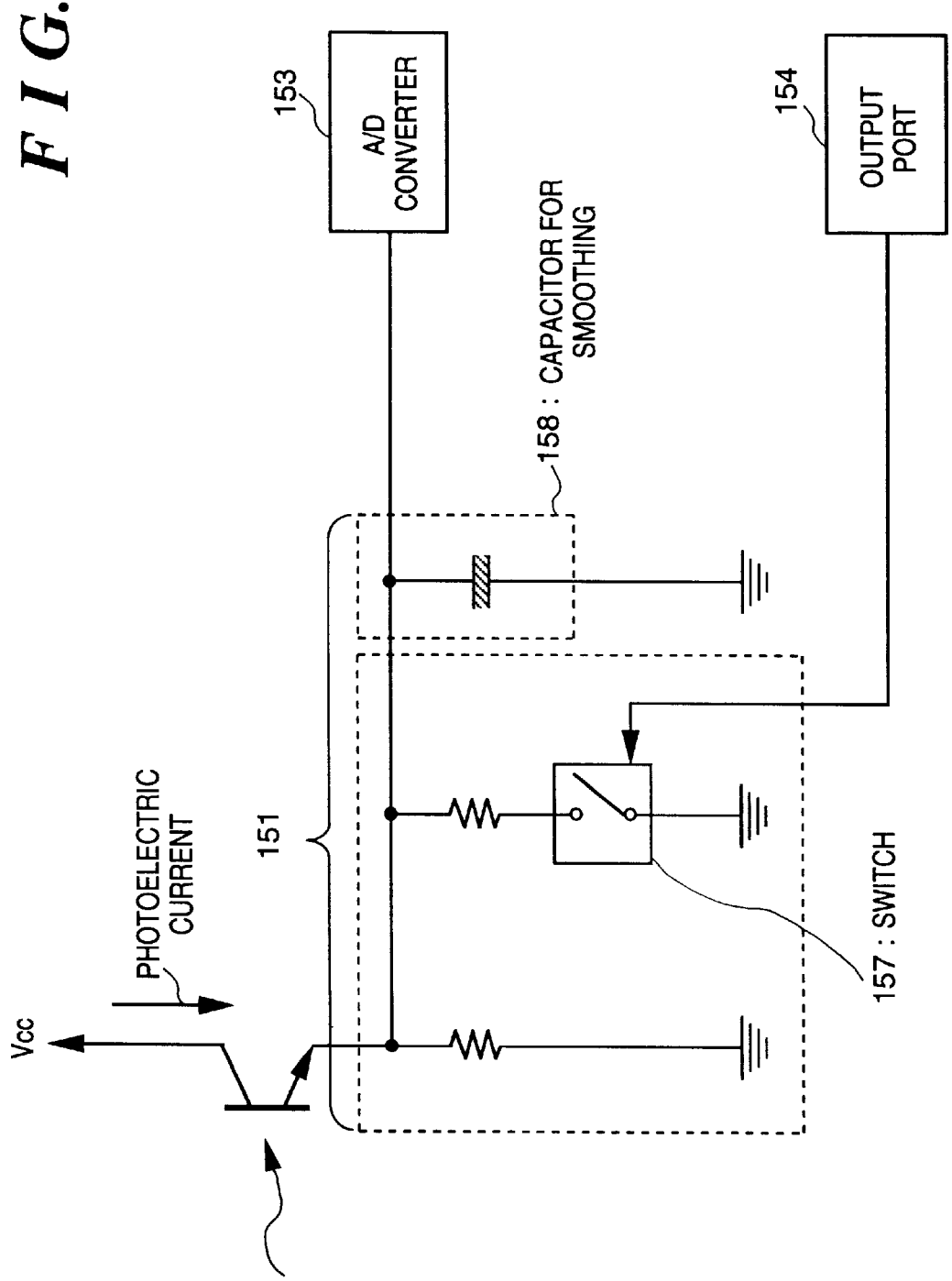
FIG. 5 is a block diagram showing the detailed construction of a current/voltage converter 151.

FIG. 5 is a block diagram showing the detailed construction of the current/voltage converter 151. As apparent from FIG. 5, when the ink cartridge 9 has sufficient ink, the output from the photosensor 11 is at a low level, consequently, a low-level signal is inputted into the A/D converter 153. On the other hand, when the ink cartridge 9 has little or no ink, the output from the photosensor 11 is at a high level, consequently, a high-level signal is inputted into the A/D converter 153. Further, a switch 157 is opened/closed (ON/OFF) in accordance with an ON/OFF signal from the output port 154.

When the switch 157 is closed (ON), as the resistance is connected in parallel, the input voltage to the A/D converter 153 is smaller than that when the switch 157 is opened (OFF).

In FIG. 5, numeral 158 denotes a capacitor for smoothing. The capacitor 158 functions to smooth the signal with the above resistance element.

<Print operation of Apparatus>

Mechanical Operation

When print operation is required for copying an original or printing a received facsimile image signal, the mechanically driven unit (not shown) rotates to drive the print-sheet separation roller 5 in the clockwise direction. At the same time, the operation of a cam as a part of the mechanically driven unit releases downward depressing of the intermediate board 3. The intermediate board 3, then pressed by the spring 4, pivots to bring the top of the plural print sheets on the ASF chassis 2 into contact with the print-sheet separation roller 5. Further, as the print-sheet separation roller 5 rotates, only the top print sheet is conveyed in a left-downward direction, to a contact point between the print-sheet convey roller 7 and the print-sheet convey rod 8. In the meantime, print-sheet detection sensor (not shown) detects a top-end position of the print sheet, then a print-sheet convey amount is calculated based on this detection result.

The print sheet, held between the print-sheet convey roller 7 and the print-sheet convey rod 8, is further conveyed in the leftward direction. As the rotation speed of the print-sheet separation roller 5 is a little faster than that of the print-sheet convey roller 7, the friction force between the print sheet and the print-sheet separation roller 5 does not become load against the convey force of the print-sheet convey roller 7. As the print sheet is conveyed, it is also held between the print-sheet discharge roller 15 and the print-sheet discharge rod 16. The print-sheet convey speed of this pair of rollers is faster than that of the print-sheet convey roller 7, but the convey force of the pair of rollers is far less than that of the print-sheet convey roller 7. Therefore, the print-sheet convey amount is determined by the print-sheet convey roller 7, and the print sheet is lightly tensed.

As the print-sheet separation roller 5 rotates one cycle and the roller position sensor 6 detects the home position of the print-sheet separation roller 5, the print-sheet separation roller 5 stops. Immediately before this operation, the intermediate board 3 is again pressed downward by the cam (not shown) as in the stand-by status. Thereafter, the rotations of the print-sheet convey roller 7 and the print-sheet discharge roller 14 are reversed, then the print sheet is conveyed in the reversed direction, in accordance with the print-sheet convey amount evaluated from the point where the top end of the print sheet has been detected by the print-sheet detection sensor, thus positioning of the print sheet is made such that the top end of the print sheet comes to the print position of the printhead.

Then, printing is performed by scanning the carriage 10 in the main-scanning direction while selectively discharging ink from the nozzles in accordance with image data. As one scanning in the main-scanning direction (forward scanning) of the carriage 10 has been completed, the print-sheet convey roller 7 and the print-sheet discharge roller 15 are rotated in the counterclockwise direction (regular rotation), to convey the print sheet by a predetermined amount (the print width of the printhead) in the leftward direction while the carriage 10 moves backward. Thereafter, printing is performed again by scanning the carriage 10 in the main-scanning direction (forward scanning) while selectively discharging the ink from the nozzles. This operation is repeated to form a print image over the print sheet. Finally, as the print-sheet detection sensor detects the rear end of the print sheet, print operation for one print sheet is finished.

When printing for a plurality of print sheets is performed, the above operation is repeated for the number of the print sheets.

Next, embodiments regarding residual-ink detection and print control based on the detection result will be described below.

[First Embodiment]

Figure 6:
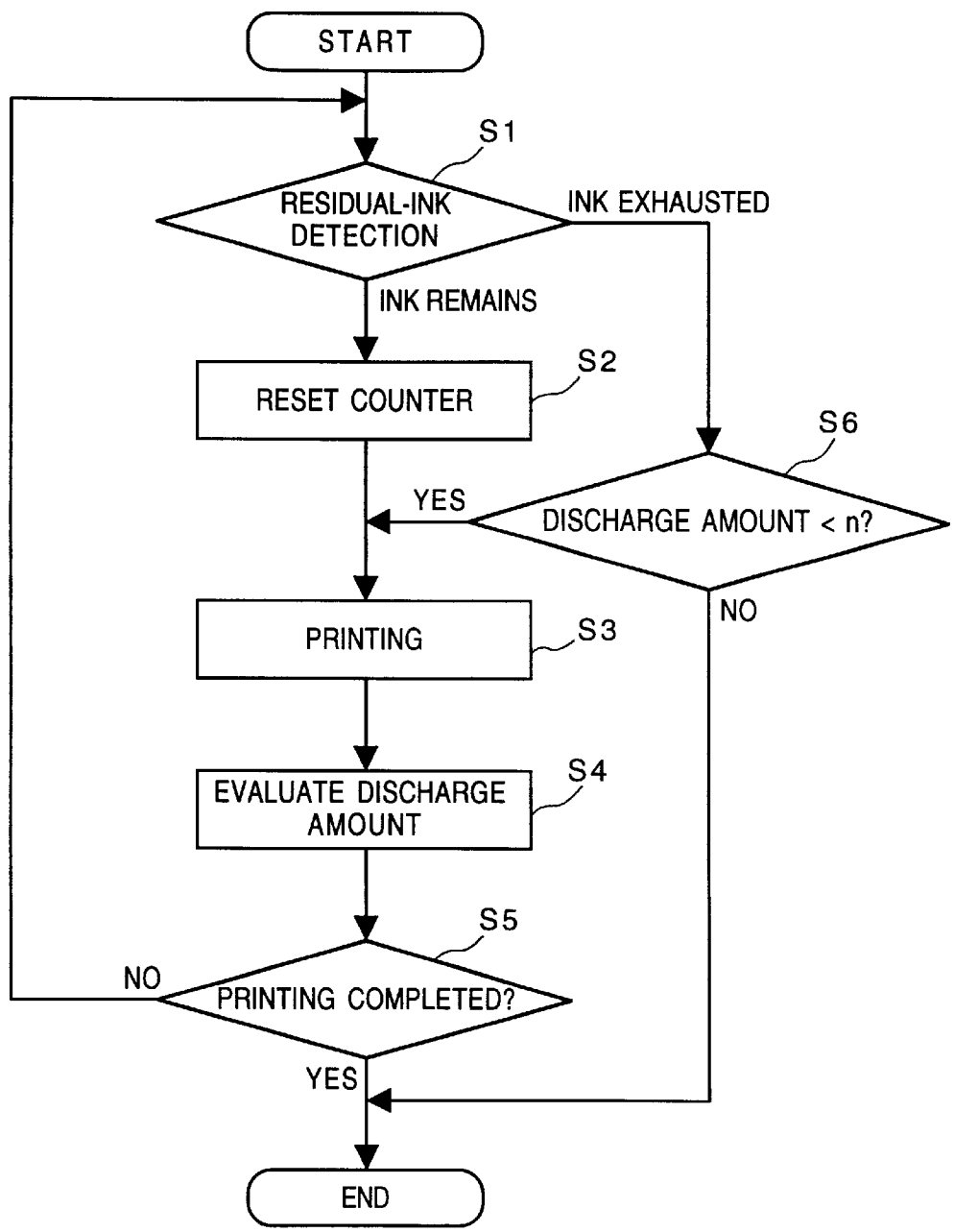
FIG. 6 is a flowchart showing the outline of print control processing based on a residual-ink amount, according to a first embodiment.

Print Control (FIG. 6)

The print control based on residual-ink detection, performed by the CPU 101 in cooperation with the residual-ink detection unit will be described with reference to the flowchart of FIG. 6. In the facsimile apparatus of this embodiment, when printing is required for printing a received facsimile image signal or for copying an image original by copying instruction, the following processing is performed.

(1) Outline of Print Control

At step S1, whether or not the ink remains is examined by using the result of detection by the residual-ink detection unit. If it is determined that the ink remains, the processing proceeds to step S2, while if it is determined that the ink is exhausted, the processing proceeds to step S6. Note that the residual-ink detection will be described in detail later.

At step S2, a count value (CNT) of an ink-discharge amount counter (hereinafter simply referred to as "counter") set in the non-volatile memory 104 is reset. This counter is used for counting the ink-discharge amount in print operation after it is determined that the ink is exhausted. When ink remains, this counter is not used, then the count value is reset. At step S3, printing (here this means printing for the print width of the printhead, performed by one scanning of the printhead in the main-scanning direction) on a print sheet is performed.

At step S4, the counter evaluates the ink-discharge amount by examining the number of pixels for actual ink discharge for one print operation (hereinafter referred to as "number of print dots"). At step S5, whether or not the series of print operation has been completed is examined. If it is determined that the print operation has been completed, the processing ends, while if it is determined that the print operation is continued, the processing returns to step S1 to repeat the above operation.

At step S6, the ink-discharge amount, i.e., the count value of the counter (CNT) is compared with a predetermined threshold value (n). If CNT<n holds, the processing proceeds to step S3, while if CNT≧n holds, the processing ends.

As the residual-ink detection unit directly detects a residual-ink amount of the liquid ink, even though it is determined, due to the structure of the ink cartridge as shown in FIG. 2, that the ink is exhausted, printing is still possible because there is a small amount of ink reservoir and in the sponge 92. Accordingly, to obtain the available amount of ink for further printing, it is necessary to perform print control such that printing can be made after it is determined that the ink is exhausted (hereinafter referred to as "further-discharging control"). This control is particularly indispensable to an apparatus using a disposable type ink cartridge as the present embodiment.

For this purpose, the predetermined threshold value (n) is determined by evaluating a residual-ink amount when the residual-ink detection unit detects that the ink is exhausted. Further, this value allows printing in any case, in consideration of difference in residual-ink detection precision, variation of ink-discharge amount due to temperature change of environment where the apparatus is installed, variation of ink-discharge amount due to difference in product quality of each printhead, change of ink-discharge amount depending on a print pattern or a print history. In a case where the printing unit 106 has function of idle-discharge of ink for maintaining discharging performance or function of suction (suction recovery) of ink from discharge orifices (nozzles) by a pump, it may be arranged such that the discharged ink amount or sucked ink amount is evaluated and the evaluation result is fed-back to the determination of the predetermined threshold value (n).

Although not directly concerned with the feature of the present embodiment, processing to stop printing will be briefly described. Normally, upon determination on stoppage of printing, it is considered that printing has not been completed on the current print sheet, then data reception is switched to alternative processing to store the received data (e.g., in facsimile image signal receiving) into a memory from the head line or head scan of the corresponding page, so that printing can be restored. Especially, since the receiving side does not have an original in facsimile image reception, it is necessary to handle received data to be printed at any time.

As indicated in the flowchart of FIG. 6, the printing stoppage processing is immediately performed, however, print control may be performed such that the printing on the current page is continued on any condition, and at a point of completion of the printing of the page, the process ends.

On the other hand, when printing accompanying copying operation is performed, a user is near the apparatus and can take appropriate actions. In this case, different from the above facsimile image reception, it may be arranged such that only a warning message is displayed on the display unit 113 to notify the user of the shortage of ink, then the printing is continued by the end of the current print sheet, and handling thereafter is left to the user.

However, in any case, the present apparatus is capable of two print operations, facsimile reception and copying, and when such print operation occurs is not known in advance. Therefore, considering that facsimile reception operation may occur at any time, the detection of residual-ink amount, the evaluation of ink-discharge amount, the comparison of the ink-discharge amount with the predetermined threshold value are always necessary. It is preferable that as soon as it is determined that the ink-discharge amount exceeds the predetermined amount, a warning is given to the user.

(2) Residual-Ink Detection

As described above, residual-ink detection is performed by using the reflection board 93 provided in the ink cartridge 9 and the photosensor 11. That is, the photosensor 11 emits light, the reflection board 93 reflects the light, then the reflected light is received by the photosensor 11, and the residual-ink amount is determined by the intensity of the reflection light received by the photosensor 11. As shown in FIG. 2, the photosensor 11 and the reflection board 93 are both provided along the moving direction (main-scanning direction) of the carriage 10, and the photoreceptor surface of the photosensor and the reflection surface of the reflection board 93 are vertical to the main-scanning direction.

Figure 7:
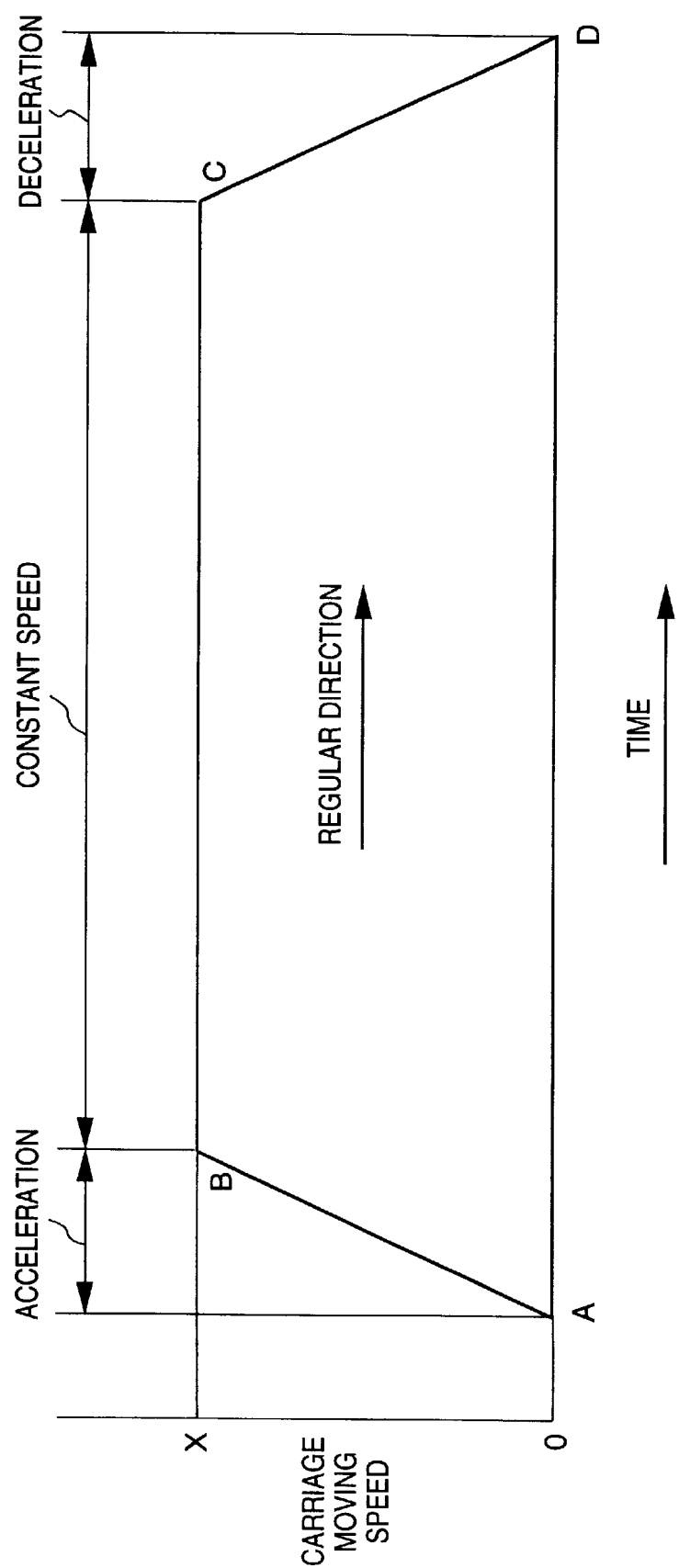
FIG. 7 is a line graph showing the change of moving speed of a carriage.

FIG. 7 is a line graph showing the change of moving speed of the carriage. Especially, FIG. 7 shows a case where the carriage 10 scans forward (this direction is referred to as "regular direction"). As shown in FIG. 7, the carriage 10 mounting the ink cartridge 9 moves at speed that changes as points A→B→C→D.

That is, the A→B portion represents acceleration; where the carriage 10 at its home position starts to move, then accelerates its moving speed, to a predetermined speed (X) as a constant speed (this is referred to as "ramp up"). The B→C portion represents constant speed (X) at which the carriage 10 moves while performing printing at the constant speed (X). The C→D portion represents deceleration where the carriage 10 mounting the printhead gradually stops with decelerating its moving speed from the constant speed (X) at a predetermined negative acceleration (this is referred to as "ramp down").

Figure 8:
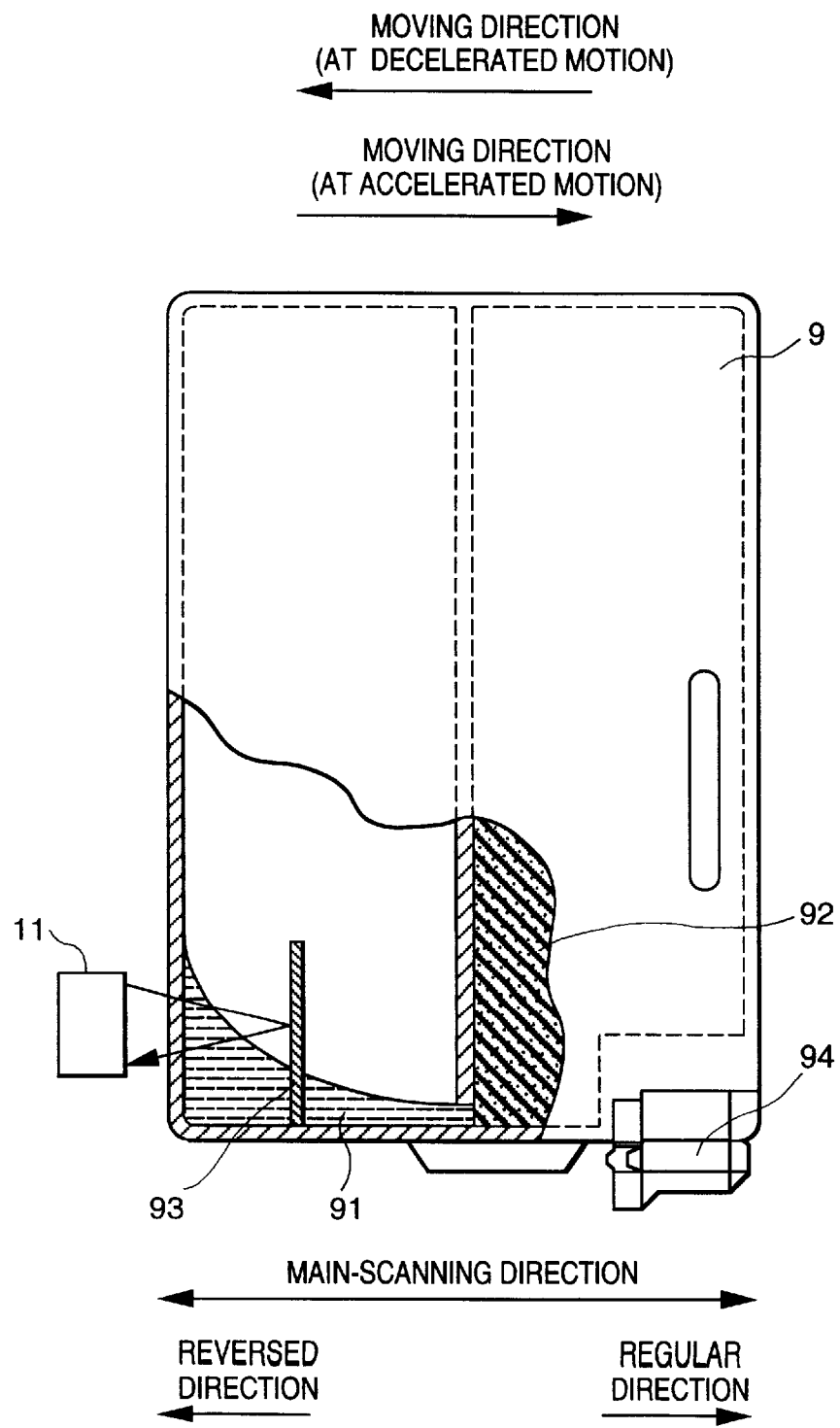
FIGS. 8 and 9 are cross-sectional views respectively showing the surface of the ink in the ink cartridge 9 at accelerated/decelerated motion of the carriage.
Figure 9:
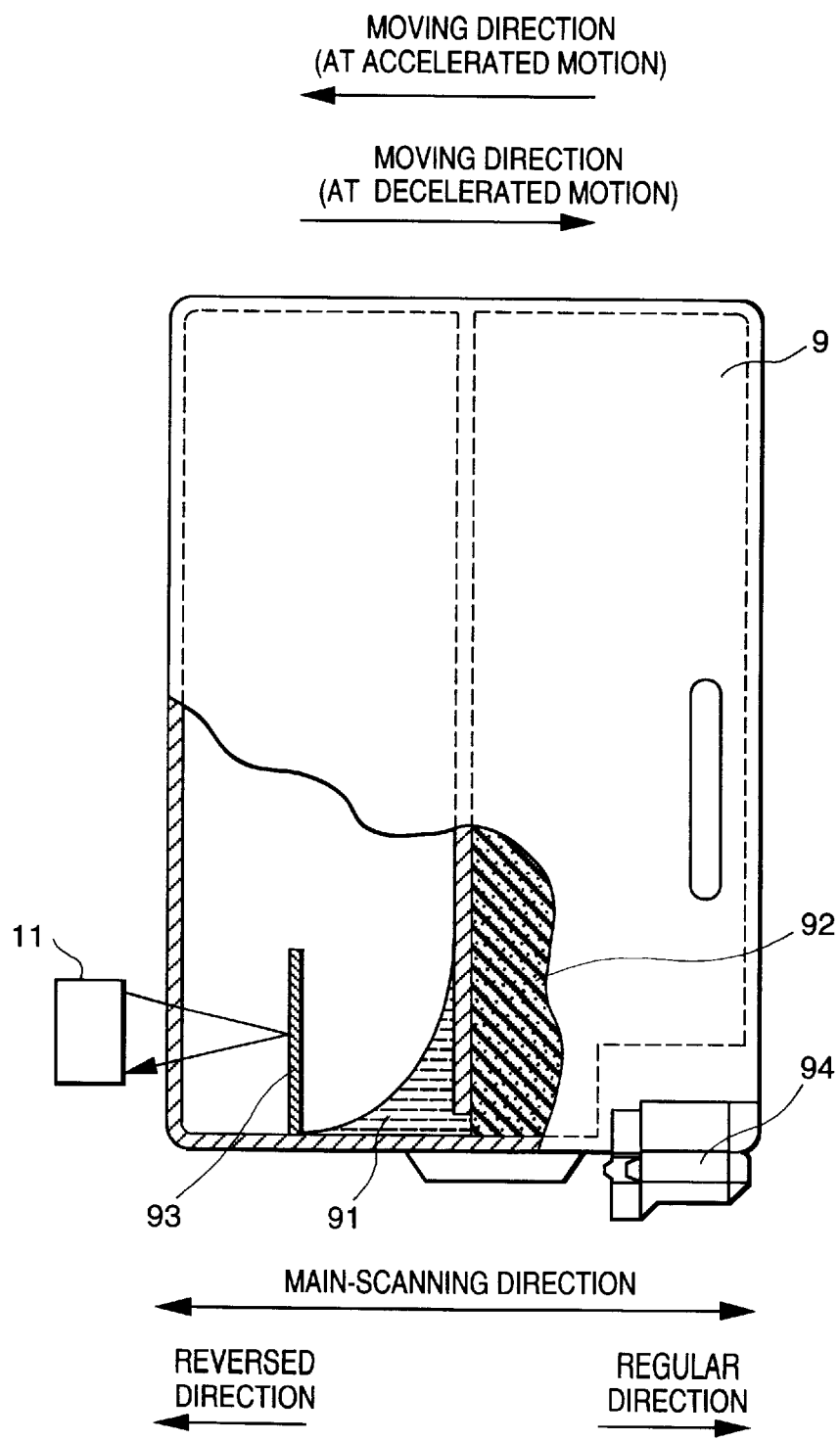

As the carriage 10 moves as above, acceleration (inertia) acts on the ink cartridge 9. That is, in the acceleration portion A→B of the regular direction movement (forward scanning) and in the deceleration of the reversed direction movement (backward scanning), the ink surface in the ink cartridge 9 is as shown in FIG. 8. On the other hand, in the deceleration portion C→D of the regular direction movement (forward scanning) and in the acceleration of the reversed direction movement (backward scanning), the ink surface in the ink cartridge 9 is as shown in FIG. 9. Note that when the carriage 10 is moving at a constant speed or stands still, no acceleration acts on the ink cartridge 9, therefore, the ink surface of the ink cartridge 9 at this time is as shown in FIG. 2.

Thus, the ink surface in the ink cartridge 9 (exactly, the interval between the side wall of the ink cartridge 9 on which the photosensor 11 is provided outside and the reflection board 93) changes in correspondence with the movement of the carriage 10.

Accordingly, the same residual-ink amount is determined as "the ink is exhausted" at one timing or "the ink remains" at another timing, depending upon the change of the ink surface. In other words, it is determined that the ink is seemingly exhausted, otherwise it is determined that the ink remains though the ink is actually exhausted, due to the change of the ink surface.

In consideration of this problem, the present embodiment performs one of the following two controls:
(1) to perform residual-ink detection in the above three statuses while monitoring the movement of the carriage, and synthetically analyze the detection results. This enables residual-ink detection in consideration of the change of ink surface due to the moving status of the carriage 10. For example, the average of the detection results from the three moving statuses of the carriage is obtained, otherwise, the detection results are integrated by time for a predetermined period (for plural scannings) to be synthetically judged.
(2) to perform residual-ink detection always at timing corresponding to one of the three statuses of the carriage (e.g. the status as shown in FIG. 2). This enables the residual-ink detection on the same condition of the ink surface.

It is preferable that residual-ink detection is performed when the status of the ink surface is as shown in FIG. 8. In this detection, even when the residual-ink amount is very small, it can be detected that the ink remains, in addition, the residual-ink can be more accurately detected.

As shown in FIG. 7, the above three statuses as residual-ink amount detection timings respectively correspond to accelerated motion (A→B), uniform motion (B→C) and decelerated motion (C→D) of the carriage 10. Based on these moving statuses, timing of residual-ink detection can be taken in connection with the driving of a carriage motor for the carriage 10, thus attaining the residual-ink amount detection at appropriate timing. Especially, if a pulse motor is employed as a drive power for the carriage 10, change of the moving status such as the ramp up and ramp down of the carriage 10 can be used as reference timing for the residual-ink amount detection.

In any case, the obtained detection result is used for determination on the amount of residual ink at step S1.

Accordingly, in consideration of change of ink surface in correspondence with the movement of the carriage, the present embodiment performs residual-ink detection, on the same condition of the ink surface, or performs residual-ink detection on plural conditions of the ink surface and synthetically evaluates the detection results. This attains more accurate residual-ink detection, and realizes more precise print control based on residual-ink amount.

Note that the detection result may be displayed as a message on the LCD of the display unit 113, or as lighting of particular LED(s), so as to notify the user of the shortage of ink. This can provide more user-friendly apparatus.

Further, it may be arranged such that ink-discharging period, time interval between residual-ink amount detections, the number of pages to be printed, the number of print dots and the like are counted so as to grasp the status of use of the apparatus and perform apparatus control based on the information. For example, if the ink-consuming period for each printing is stored, when it is detected that the ink is exhausted, time at which the ink is completely exhausted can be predicted based on the accumulated ink-consuming period, and display control can be performed so as to notify the user of the predicted time with a message.

[Second Embodiment (FIG. 10)]

Next, the print control based on a residual-ink amount according to a second embodiment will be described with reference to the flowchart of FIG. 10. This control is performed by the CPU 101 in cooperation with the residual-ink detection unit. In the facsimile apparatus of this embodiment, when printing is required for receiving a facsimile image signal or for copying an original by a copying instruction, the following processing is executed. It is assumed that the power of the apparatus has been turned on, various initial settings or initialization processing, necessary for print operation, have already been performed on the counter used for evaluating the ink-discharge amount (subtraction counter; hereinafter simply referred to "counter"), whose count value is set in the non-volatile memory 104, and the like.

At step S11, whether or not print operation is required is examined. If YES, the processing proceeds to step S12, on the other hand, if NO, proceeds to step S17.

Next, at step S12, print operation (printing for the print width of the printhead executed by one-scanning of the printhead in the main-scanning direction) is performed on a print sheet At this time, the number of ink-discharge dots (DN) necessary for the print operation is measured.

At step S13, whether or not ink remains is examined by using the result of detection by the residual-ink detection unit. If it is determined that ink remains, the processing proceeds to step S14, while if it is determined that the ink is exhausted, proceeds to step S16. Note that the residual-ink detection will be described in detail later.

At step S14, initial-setting of the counter, whose value is set in the non-volatile memory 104, is performed again. As this counter is a decrementing counter in this embodiment, in this setting, a predetermined positive threshold value (CNT: for further-discharge amount) is set. If it is determined that the ink is exhausted, the counter is used for counting the ink-discharge amount in printing after the determination. If it is determined that the ink remains, the counter is not used.

At step S15, the count value (CNT) is compared to "0". If CNT>0 holds, it is determined that printing is possible, then the processing returns to step S11 to repeat the above operation. On the other hand, if CNT≦0 holds, it is determined that printing is impossible, then the processing proceeds to step S21, at which the print operation is forcibly terminated. Thereafter, the processing ends.

At step S16, the number of ink-discharge dots (DN) obtained at step S12 is subtracted from the count value (CNT) to obtain a difference as a new count value (CNT). Then the processing proceeds to step S15.

On the other hand, at step S17, whether or not recovery requirement has been made is examined. If YES, the processing proceeds to step S18, while if NO, returns to step S11 to repeat the above operation.

At step S18, recovery operation is performed. This is a series of operations to restore (recover) usable status by sucking the ink-discharge orifices (nozzles) clogged with dust and dried ink by using a pump. The recovery operation is usually realized by two methods: (1) manual recovery operation where a user checks good/poor image quality from a printed image and performs recovery by manual operation; and (2) automatic recovery operation performed at a fixed intervals (e.g., 72 hours) utilizing a timer, mainly for preventing clogging of the ink-discharge orifices with dried ink. In this embodiment, the recovery operation can be performed by any method.

Next, at step S19, an ink-discharge amount value (S), converted from the amount sucked by the pump, is subtracted from the count value (CNT) to obtain a difference as a new count value (CNT). The ink-discharge amount value (S) is a predetermined constant to be described later. At step S20, the count value (CNT) is compared with the predetermined threshold value (n). If CNT>n holds, the processing returns to step S1 to repeat the above operation. On the other hand, if CNT≦n holds, the processing proceeds to step S21, to forcibly terminate the print operation, then the processing ends. Note that the threshold value (n) will be described later.

The above processing can be briefly outlined from the point of ink amount as follows.

When the ink cartridge 9 is first attached, as the ink tank contains sufficient ink, the print control processing is repeated through the route of steps S11→S12→S13→S14→S15→S11 . . . performing printing. In this case, as the predetermined threshold value (CNT) is always set as the initial value at step S14, the count value (CNT) is maintained as a constant value. In the middle of the printing, recovery operation is performed, then the print control processing advances through the route of steps S11→S17→S18→S19→S20→S11. Even though the count value temporarily decreases, it becomes the same value through the residual-ink amount detection at step S13 and the re-setting of initial value at step S14.

On the other hand, if the ink has decreased and it is determined at step S13 that the ink is exhausted, the processing advances through the route of steps S11→S12→S13→S16→S15→S11 . . . . In this case, the number of ink-discharge dots (DN) corresponding to actual ink-discharging per one print operation, evaluated at step S12, is subtracted from the count value (CNT) at step S16, thus the count value gradually decreases. Further, printing proceeds and the count value (CNT) becomes "0" or less, CNT≦0 holds at step S15, then the printing is forcibly terminated.

Accordingly, even if it is determined that the ink is exhausted, printing can be performed by using the actually existing residual ink until CNT≦0 holds. The further-discharge control according to the present embodiment is performed in this manner.

During this further-discharge control, if recovery requirement is made, the processing advances through the route of steps S11→S17→S18→S19→S20→S11 . . . performing recovery operation. Thereafter, the processing advances through the route of steps S11→S17→S11 . . . into waiting status for print requirement or recovery requirement. Since the recovery operation is sucking ink by a pump as described above, the ink decreases similar to ink-discharging. However, the amount of sucked ink is evaluated independently of the evaluation of the ink-consumption amount in printing. Specifically, at step S20, this amount is obtained by subtracting a constant (S), which is the number of ink-discharge dots converted from ink-consumption amount in one recovery operation, from the count value (CNT). The converted value (S) is set in consideration of variations in nozzles which occur in manufacturing process, variation in the amount of ink sucked by the pump provided in the apparatus, variation in an ink-suck amount due to of temperature change, and the like.

Further, there is a case that it is determined that the ink remains, but it is determined in the following recovery operation that the ink is exhausted. In such case, if counting operation for further-discharge control is performed from the point of the completion of the recovery operation, the count value may be greater than the actual residual-ink amount by an ink-consumption amount by the recovery operation.

For example, in case of facsimile image reception, the apparatus must avoid normal reception operation if the ink is exhausted. In this reception, as the apparatus on the receiving side has no original, it must print all the received data on printing sheets, store the data into a memory until printing becomes possible again, or inform the transmitting side that the facsimile reception is impossible not to perform normal facsimile communication.

For the above reason, as it might be determined immediately after recovery operation that the ink is exhausted, it is necessary to take the ink-consumption amount by the previous recovery operation into consideration for the further-discharge control. Accordingly, at step S19, the value corresponding to the amount of ink consumed in the recovery operation is subtracted from the count value regardless of existence/shortage of ink. On the other hand, at step S13, if it is determined during the print operation that the ink remains, the predetermined threshold value is set again as the initial value of the counter at step S14. This cancels the difference between the previous recovery operation and the latest printing operation.

Next, recovery operation in a case where ink is exhausted from an ink cartridge as printing operation goes on will be described.

As described above, the ink cartridge 9 has a sponge 92 to supply ink to the printhead 94 always under a constant pressure, and the ink tank containing liquid-state ink to supply the ink little by little to the sponge 92. In other words, the sponge 92 works as a buffering material. As residual-ink detection is performed with respect to the liquid ink in the ink tank, even if it is detected that the ink is exhausted, there is a little amount of ink in the ink tank and the sponge 92. Under this condition, printing is continued while performing further-discharge control, until the ink in the ink tank is completely exhausted, and only the ink included in the sponge 92 exists.

At this time, in case of consuming ink in normal print operation, as the ink is discharged from the ink-discharge orifices of the printhead 94, the air pressure within the nozzles is lowered, corresponding to the discharged ink amount, the ink included in the sponge 92 is supplied through an ink-introduction pipe (not shown) in contact with the sponge 92. As this ink supply is made slowly, the ink included in the sponge 92 is continuously supplied by surface tension. In practice, the ink viscosity, the surface tension, the sponge material/density, the diameter of the ink-introduction pipe and the like are set for this purpose.

However, in a case where the ink is abruptly suck-discharged as in recovery operation, ink supply to the printhead 94 cannot be made in the above manner, and air included in or around the sponge 92 is sucked. As a result, printing cannot be normally performed. Accordingly, it is apparent that if recovery operation is performed during further-discharge control, it is not always possible to perform printing by using the actually existing residual ink until the ink is completely exhausted. In other words, the effective ink amount (the amount of ink which can be actually used for printing) is smaller than the residual-ink amount.

In this embodiment, as residual-ink detection is performed with respect to the liquid ink in the ink tank, for the purpose of continuing print operation, using the residual ink within a range to allow continuous ink supply, print control appropriate to this purpose is desired. For this purpose, print control determines whether or not to forcibly terminate print operation after the ink has been consumed in recovery operation during further-discharge control, and similar print control after the ink has been consumed in print operation during further-discharge control, must be separately made. Otherwise, even if the residual ink is too little to perform normal printing, further-discharge control to continue printing is performed, which is inconvenient to, especially, facsimile reception operation.

In consideration of the above problems, the count value (CNT) is compared with the predetermined threshold value (n) at step S20 so that determination (whether or not forced termination of printing after recovery operation should be made) can be made independent of the determination at step S15 (whether or not forced termination of printing after print operation should be made). The threshold value (n) which is greater than that at step S15 ("0") is set such that normal printing can be performed even if recovery operation is performed immediately before the ink is completely exhausted. Further, this value is determined in consideration of variation in printheads which occurs in manufacturing process, variation in pump performance, various fluctuations due to temperature change and the like.

Note that once air is introduced into the nozzles, air-supply path is formed in the sponge 92, thereafter, ink cannot be supplied to the nozzles even if print operation is performed. This shortage of ink due to the mixture of air may occur depending upon the apparatus or installation environment.

As the ink in the ink tank decreases, there may exist transient time at which the boundary between the determination that ink remains and the determination that ink is exhausted is vague. At this time, it can be determined that ink remains, but it can also be determined that ink is exhausted, from various factors such as the moving speed of the printhead, the print width, and the inclination of the apparatus. In a case where this phenomenon occurs, if it is determined that ink remains, the print control processing advances through the route of steps S11→S12→S13→S14→S15→S11 . . . , and the count value (CNT) is set again at step S14. Accordingly, in print operation after the final determination that ink remains is made, the count value (CNT) starts to gradually decrease. Similarly, in a case where it is erroneously determined that ink is exhausted, due to, e.g., impingement of sunlight, even though ink actually remains, if it is determined in the next print operation that ink remains, the count value is set again, as a result, erroneous operation can be prevented.

In contrast, in a case where it is determined that ink remains even though ink is actually exhausted, due to noise and the like, the count value (CNT) is set again, which may cause erroneous operation.

Figure 10:
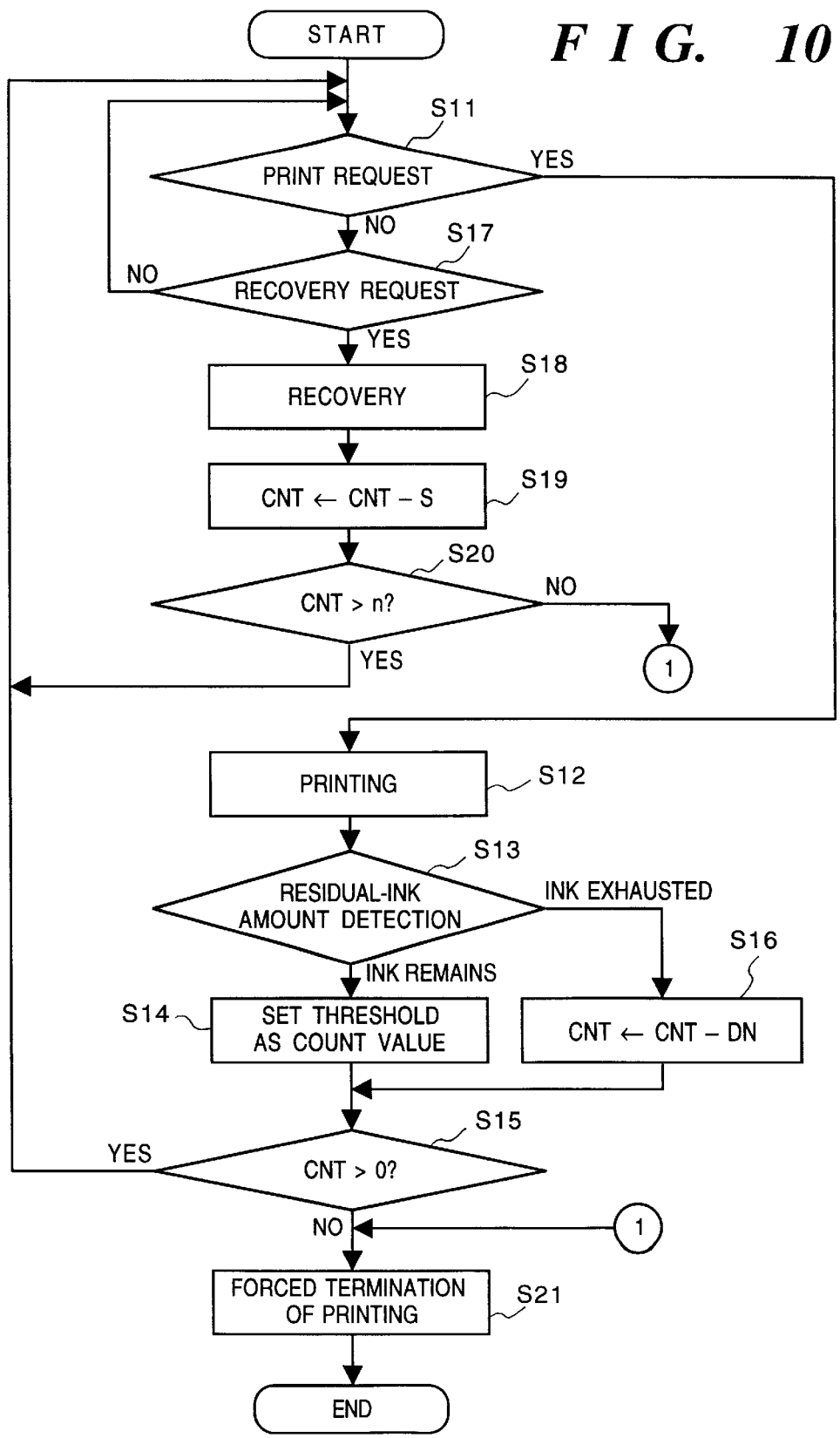
FIG. 10 is a flowchart showing the outline of print control processing based on a residual-ink amount, according to a second embodiment.

To prevent such erroneous operation, the print-control processing as shown in the flowchart of FIG. 10 may be arranged such that re-setting of the count value is not made based on only one determination, but is made if it is determined after a plurality of residual-ink detections that ink remains.

Note that the residual-ink detection at step S13 is made in a similar manner to that described in the first embodiment, and the detection result is used for determination of the residual-ink detection at step S13.

According to the present embodiment, even if the amount of ink in the ink cartridge decreases and it is determined that ink is exhausted, print operation can be continued by using the actually existing residual ink under further-discharge control. Further, even recovery operation is performed and ink is abruptly discharged, printing can be controlled in consideration of the ink-discharge amount. Furthermore, even if the recovery operation is performed during the further-discharge control, printing can be controlled in consideration of the possibility of introduction of air due to the recovery operation. Thus, print control with higher precision in consideration of effective residual-ink amount can be implemented.

[Third Embodiment (FIGS. 11–13)]

Next, the print control based on a residual-ink amount according to a third embodiment will be described with reference to the flowcharts of FIGS. 11 and 12. This control is performed by the CPU 101 in cooperation with the residual-ink detection unit. In the facsimile apparatus of this embodiment, when printing is required for receiving a facsimile image signal or for copying an original by a copying instruction, the following processing is executed. Note that in the flowchart of FIG. 11, steps corresponding to those described in the first embodiment have the same reference numerals and the explanations of the steps will be omitted. Further, processings corresponding to those described in the foregoing embodiments will not be explained again. The following description will be made with regard to only processing characteristic of the present embodiment.

As pointed in the conventional art, the photosensor for residual-ink detection may have erroneous operation when it receives an intense unexpected incident light such as sunlight or spotlight.

In the structure of this apparatus, the printing unit 106 necessarily has an opening to discharge print sheet. In printing in accordance with an ink-jet printing method, if printed surface of a print sheet is in contact with a part of the apparatus such as a guide, the printed image might be blurred, which causes degradation of printing quality. Accordingly, it is preferable that the printed sheet is discharged immediately after printing, and the distance from the printhead to the print-sheet discharge orifice (i.e., the opening) is short. On the other hand, since there is already the residual-ink detection unit around the printhead, the external light incident from the opening may easily enter the photoreceptor of the photosensor 11.

As shown in FIG. 1, in the structure of this apparatus, the printing unit 106 typically performs printing by discharging ink from upper positions downward and conveying a print sheet in a horizontal direction. For this printing, the ink cartridge 9 is at a relatively higher position to the print-sheet discharge orifice. This means the photosensor 11 is also at a relatively higher position to the print-sheet discharge orifice. By virtue of this structure, the photosensor 11 seldom receives external light directly, but may receive reflected light from a desk on which the apparatus is placed or a discharged print sheet. However, such indoor light having a weak intensity cannot be a main cause of erroneous judgment of residual-ink detection.

Accordingly, light that might cause a problem is only sunlight, especially diagonally incoming sunlight with a small incident angle, i.e., sunlight that may impinge upon the apparatus for a short period (e.g., an hour) in mornings and evenings.

Figure 11:
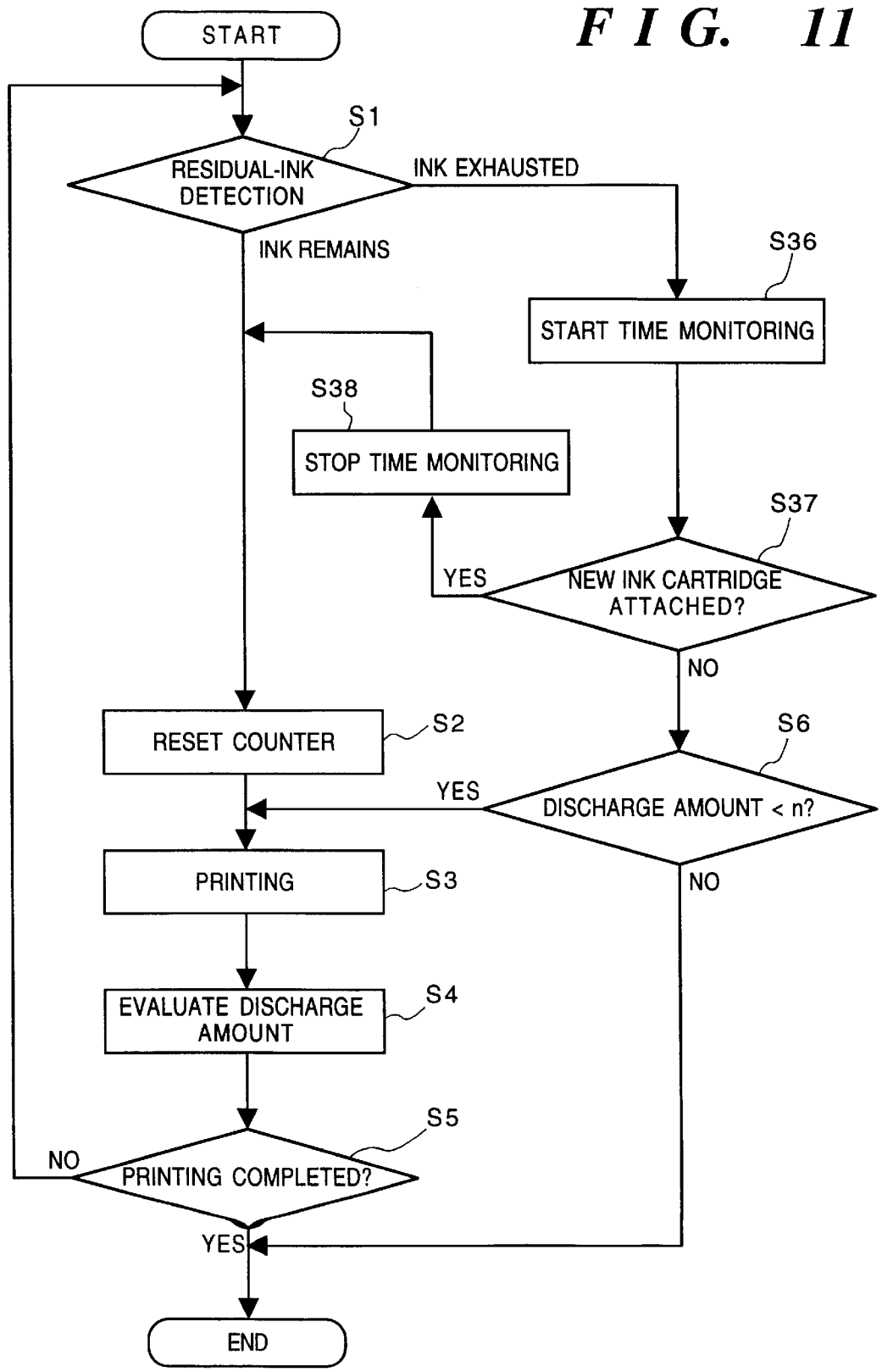
FIG. 11 is a flowchart showing the outline of print control processing based on a residual-ink amount, according to a third embodiment.

The following processing in accordance with FIG. 11 includes print control to cope with such erroneous detection due to incident sunlight.

At step S1, if it is determined that the ink is exhausted, the processing proceeds to step S36. Note that the residual-ink detection at step S1 is the same as that described in the first embodiment.

Figure 12:
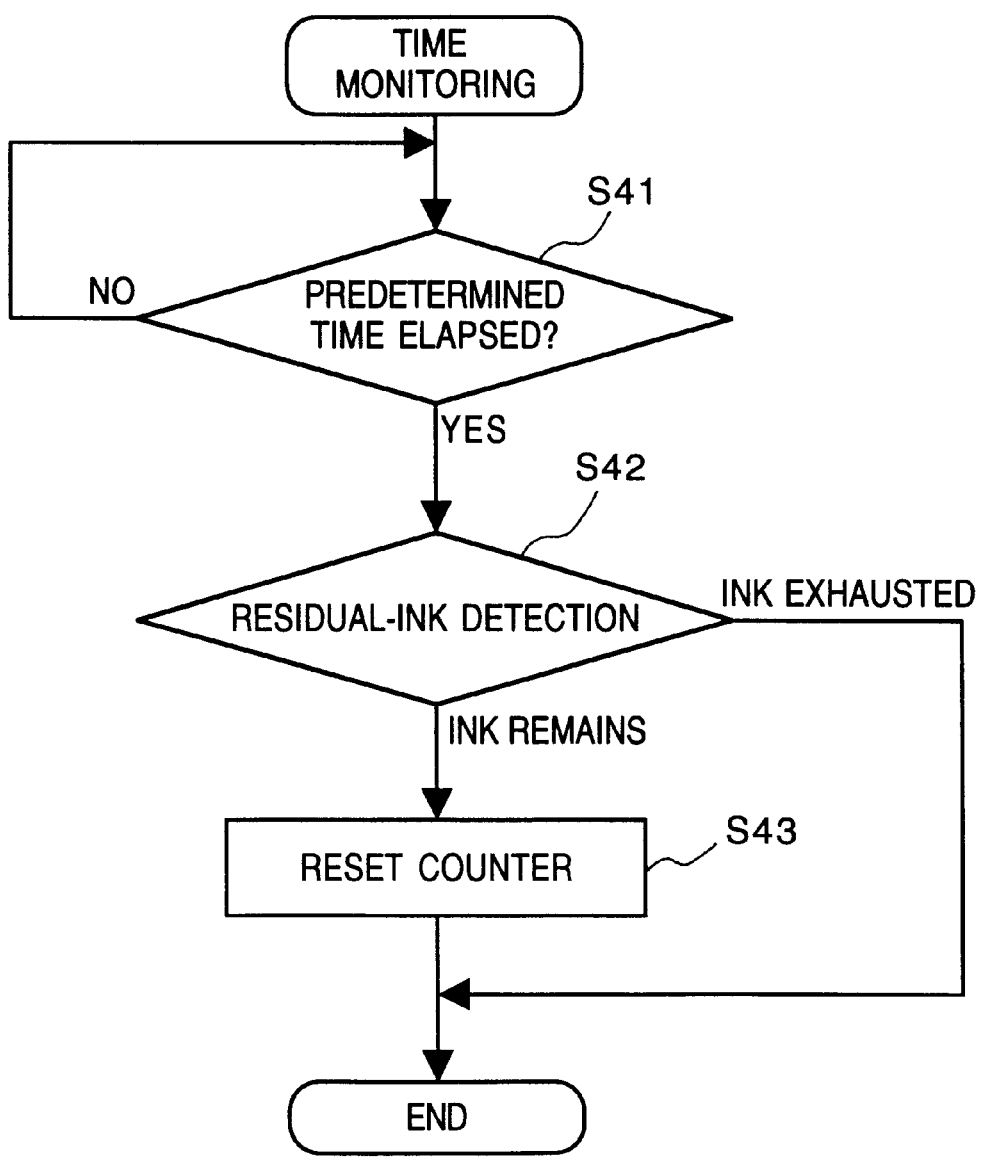
FIG. 12 is a flowchart showing the residual-ink detection control with time monitoring.

At step S36, time evaluation as shown in the flowchart of FIG. 12 is started from the time (T0) at which the shortage of ink is determined. This processing is performed in parallel to the print control by the CPU 101 as shown in FIG. 11. Hereinafter, the time evaluation will be described with reference to FIG. 12.

At step S41, whether or not a predetermined period has elapsed from the time T0 is examined. This is made on the assumption that the impingement of sunlight must occur at particular time period in mornings and evenings and it does not occur after the predetermined period. When it is determined that the predetermined period has elapsed, the processing proceeds to step S42, to perform residual-ink detection again.

If it is again determined that the ink is exhausted, the time evaluation is terminated. On the other hand, if it is determined that the ink remains, the processing proceeds to step S43 to reset the count value (CNT), and the time evaluation is terminated. In this manner, on the premise that the period of impingement of sunlight is only a part of daytime, residual-ink detection is performed again after a predetermined period from a point (T0) at which the shortage of ink is determined, thus preventing erroneous judgment of residual-ink detection.

After time evaluation has been started at step S36, the processing proceeds to step S37, at which whether or not a new ink cartridge has been attached is examined, based on the result of detection by the cartridge attachment/detachment sensor 156. For detecting attachment/detachment of the ink cartridge, a connection point may be provided at an electrical connection point between the ink cartridge 9 and the carriage 10, in place of the cartridge attachment/detachment sensor 156. If it is determined that a new ink cartridge has been attached, the processing proceeds to step S38 to terminate the current time evaluation, since it is expected that the new ink cartridge is filled up with ink and residual-ink detection is unnecessary. Thereafter, the processing returns to step S2. On the other hand, if it is determined that the ink cartridge has not been changed, the processing proceeds to step S6.

Note that, however, if the determination of attachment/detachment of the ink cartridge is impossible due to unexpected shut-down of the power or the like, the print operation is forcibly terminated. At step S6, the ink-discharge amount, i.e., the count value (CNT) is compared with the predetermined threshold value (n). If CNT<n holds, the processing proceeds to step S3, while if CNT≧n holds, the processing ends.

According to the present embodiment, even if it is determined in residual-ink detection that the ink is exhausted, time monitoring is performed for a predetermined period from the time of determination, and the residual-ink detection is performed again after the predetermined period. This prevents erroneous determination of residual-ink detection due to incident light such as sunlight, which might occur in a particular period in mornings and evenings, and attains more precise residual-ink detection.

Note that the idea of further-discharge control and that of stoppage of print operation are similar to those described in the first embodiment.

Figure 13:
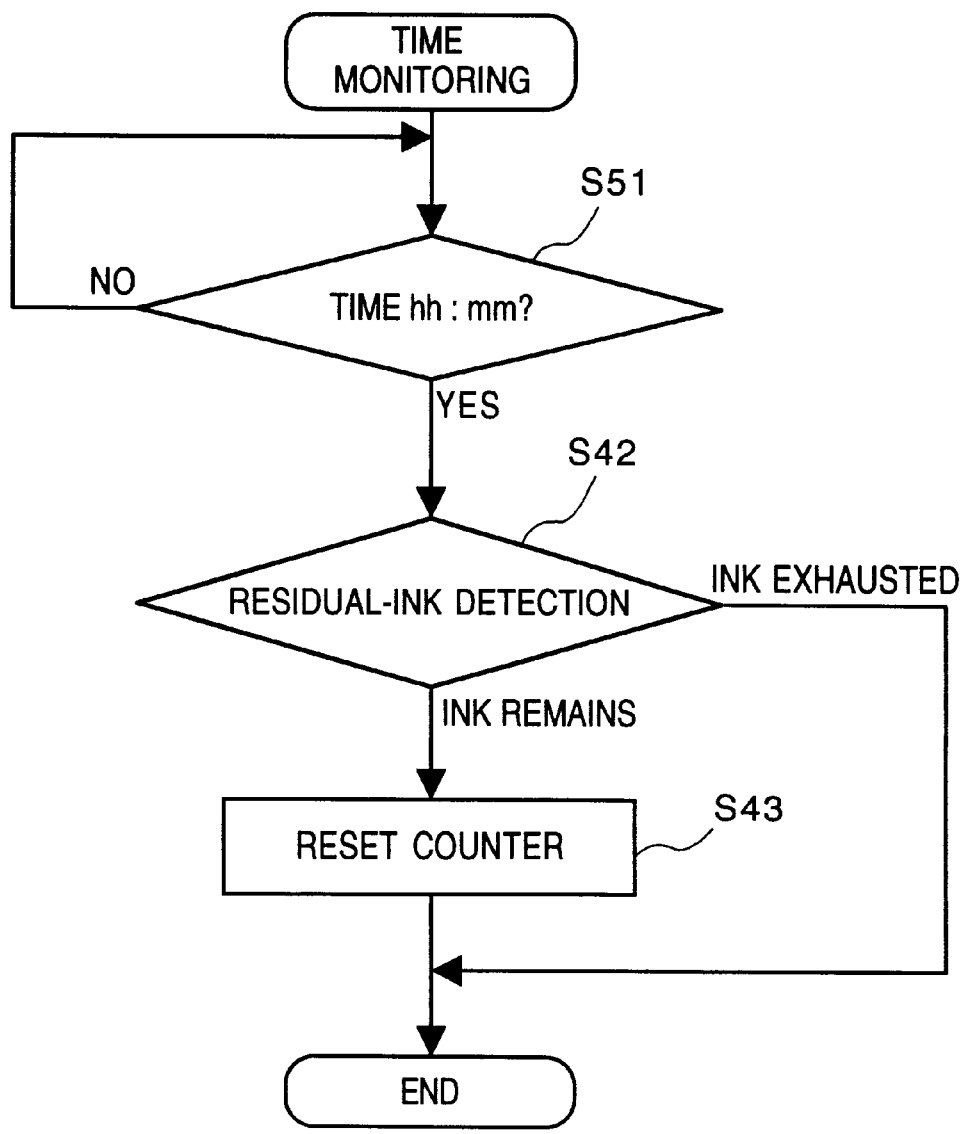
FIG. 13 is a flowchart showing another example of the residual-ink detection control with time monitoring.

In the present embodiment, if it is determined that ink is exhausted, residual-ink detection is again performed after a predetermined period, however, the present invention is not limited to this arrangement. As shown in the flowchart of FIG. 13, a clock provided in the apparatus can be utilized to re-perform residual-ink detection. Further, in the flowchart of FIG. 13, at step S51, whether or not current time corresponds to a particular time is examined. In this figure, the other steps are the same as those in FIG. 12.

Further, in FIG. 11, unless print operation is repeated in the particular time period in mornings and evenings, the time evaluation at step S36 and related steps S37 and S38 may be omitted. Even if it is erroneously determined due to incident light that ink is exhausted but the ink actually remains, as the incident light disappears with passage of time or in the progress of printing, it is determined in the next residual-ink detection that the ink remains, and print operation can be normally restored, without the processings at steps S36 to S38.

The embodiment described above has exemplified a printer, which comprises means (e.g., an electrothermal transducer, laser beam generator, and the like) for generating heat energy as energy utilized upon execution of ink discharge, and causes a change in state of an ink by the heat energy, among the ink-jet printers. According to this ink-jet printer and printing method, a high-density, high-precision print operation can be attained.

As the typical arrangement and principle of the ink-jet printing system, one practiced by use of the basic principle disclosed in, for example, U.S. Pat. Nos. 4,723,129 and 4,740,796 is preferable. The above system is applicable to either one of the so-called on-demand type or a continuous type. Particularly, in the case of the on-demand type, the system is effective because, by applying at least one driving signal, which corresponds to printing information and gives a rapid temperature rise exceeding film boiling, to each of electrothermal transducers arranged in correspondence with a sheet or liquid channels holding a liquid (ink), heat energy is generated by the electrothermal transducer to effect film boiling on the heat acting surface of the printhead, and consequently, a bubble can be formed in the liquid (ink) in one-to-one correspondence with the driving signal. By discharging the liquid (ink) through a discharge opening by growth and shrinkage of the bubble, at least one droplet is formed. If the driving signal is applied as a pulse signal, the growth and shrinkage of the bubble can be attained instantly and adequately to achieve discharge of the liquid (ink) with the particularly high response characteristics.

As the pulse driving signal, signals disclosed in U.S. Pat. Nos. 4,463,359 and 4,345,262 are suitable. Note that further excellent printing can be performed by using the conditions described in U.S. Pat. No. 4,313,124 of the invention which relates to the temperature rise rate of the heat acting surface.

As an arrangement of the printhead, in addition to the arrangement as a combination of discharge nozzles, liquid channels, and electrothermal transducers (linear liquid channels or right angle liquid channels) as disclosed in the above specifications, the arrangement using U.S. Pat. Nos. 4,558,333 and 4,459,600, which disclose the arrangement having a heat acting portion arranged in a flexed region is also included in the present invention. In addition, the present invention can be effectively applied to an arrangement based on Japanese Patent Laid-Open No. 59-123670 which discloses the arrangement using a slot common to a plurality of electrothermal transducers as a discharge portion of the electrothermal transducers, or Japanese Patent Laid-Open No. 59-138461 which discloses the arrangement having an opening for absorbing a pressure wave of heat energy in correspondence with a discharge portion.

In addition, an exchangeable chip type printhead which can be electrically connected to the apparatus main unit and can receive an ink from the apparatus main unit upon being mounted on the apparatus main unit or a cartridge type printhead in which an ink tank is integrally arranged on the printhead itself can be applicable to the present invention.

It is preferable to add recovery means for the printhead, preliminary auxiliary means, and the like provided as an arrangement of the printer of the present invention since the print operation can be further stabilized. Examples of such means include, for the printhead, capping means, cleaning means, pressurization or suction means, and preliminary heating means using electrothermal transducers, another heating element, or a combination thereof. It is also effective for stable printing to provide a preliminary discharge mode which performs discharge independently of printing.

Furthermore, as a printing mode of the printer, not only a printing mode using only a primary color such as black or the like, but also at least one of a multi-color mode using a plurality of different colors or a full-color mode achieved by color mixing can be implemented in the printer either by using an integrated printhead or by combining a plurality of printheads.

Moreover, in each of the above-mentioned embodiments of the present invention, it is assumed that the ink is a liquid. Alternatively, the present invention may employ an ink which is solid at room temperature or less and softens or liquefies at room temperature, or an ink which liquefies upon application of a use printing signal, since it is a general practice to perform temperature control of the ink itself within a range from 30° C. to 70° C. in the ink-jet system, so that the ink viscosity can fall within a stable discharge range.

In addition, in order to prevent a temperature rise caused by heat energy by positively utilizing it as energy for causing a change in state of the ink from a solid state to a liquid state, or to prevent evaporation of the ink, an ink which is solid in a non-use state and liquefies upon heating may be used. In any case, an ink which liquefies upon application of heat energy according to a printing signal and is discharged in a liquid state, an ink which begins to solidify when it reaches a printing medium, or the like, is applicable to the present invention. In this case, an ink may be situated opposite electrothermal transducers while being held in a liquid or solid state in recess portions of a porous sheet or through holes, as described in Japanese Patent Laid-Open No. 54-56847 or 60-71260. In the present invention, the above-mentioned film boiling system is most effective for the above-mentioned inks.

In addition, the ink-jet printer of the present invention may be used in the form of a copying machine combined with a reader, and the like, or a facsimile apparatus having a transmission/reception function in addition to an image output terminal of an information processing equipment such as a computer.

The present invention can be applied to a system constituted by a plurality of devices, or to an apparatus comprising a single device. Furthermore, it goes without saying that the invention is applicable also to a case where the object of the invention is attained by supplying a program to a system or apparatus.

As many apparently widely different embodiments of the present invention can be made without departing from the spirit and scope thereof, it is to be understood that the invention is not limited to the specific embodiments thereof except as defined in the appended claims.

What is claimed is:

1. A residual-ink detection method in a printing apparatus which performs printing by reciprocally scanning a printhead together with an ink container for supplying ink to the printhead and discharging the ink from the printhead onto a printing medium during scanning of the printhead and the ink container, of detecting a decrease of an ink level in the ink container comprising:

a detection step of, at a predetermined timing, detecting a change of the ink level in the ink container so as to determine the decrease of residual-ink in the ink container wherein the predetermined timing is a timing when the ink level in the ink container is tilted due to accelerated motion or decelerated motion in scanning of the printhead and the ink container.

2. The method according to claim 1, wherein the ink container is integrated with the printhead.

3. The method according to claim 1, wherein said detection step performs detection, by emitting light to a light-transmitting portion of the ink container and receiving the light reflected by a reflection board provided within the ink container, in accordance with an amount of the received light whose intensity varies according to the ink level in the ink container.

4. An ink residual-ink detection method in a printing apparatus which scans a printhead with an ink container for containing ink and supplying the ink to the printhead discharges the ink from the printhead, performs printing on a printing medium, and performs suction operation by sucking the ink from the printhead by using a suction unit so as to recover a good discharging condition, comprising:

a detection step of emitting light from a light-emitting device to a light-transmitting portion of the ink container, receiving the light returning back to a photoreceptor, and detecting a status as to whether or not the ink in the ink container is exhausted in accordance with an amount of the light received by the photoreceptor, whose intensity varies according to an ink level in the ink container;

a print control step of, after it is determined from the status detected in said detection step that the ink is exhausted, determining when to stop the printing by the printhead based on an accumulated amount obtained from accumulating an ink-discharge amount consumed by discharging the ink from the printhead and an ink-consumption amount sucked by the suction unit, wherein said print control step differentiates between cases for a threshold used for comparing with the accumulated amount for determining when to stop the printing, a first case being where the ink is exhausted for the printing and a second case being where the ink is exhausted for the suction by the suction unit.

5. An ink residual-ink detection method in a printing apparatus which scans a printhead, discharges the ink from the printhead, and performs printing on a printing medium, of determining a decrease of residual-ink in the ink container for containing the ink and supplying the ink to the printhead, comprising:

a detection step of detecting a decrease of an ink level in the ink container;

a calculation step of, after it is determined from a detection result by said detection step that the ink level is lower than a predetermined level, calculating an amount of ink consumed by the printhead; and a print control step of controlling to suppress printing by the printhead, when the calculated amount of ink consumed by the printhead reaches a predetermined amount, wherein if it is detected that the ink container has been exchanged during calculating the amount of ink consumed by the ink container, said print control step controls to halt the calculation at said calculation step.

6. A printing apparatus which scans a printhead, discharges ink from the printhead, and performs printing on a printing medium, comprising:

scan means for reciprocally scanning the printhead;

an ink container, containing the ink, being reciprocally scanned together with the printhead by said scan means, for supplying the ink to the printhead;

detection means for detecting a change of an ink level in the ink container so as to determine a decrease of residual-ink in the ink container; and timing control means for controlling detection timing of said detection means such that status detection during scanning of the printhead and the ink container can always be made on a predetermined detection condition, wherein the predetermined detection condition corresponds to a state where the ink level in the ink container is tilted due to one of accelerated motion or decelerated motion in scanning of the printhead and the ink container.

7. The apparatus according to claim 6, wherein the ink container is integrated with the printhead.

8. The apparatus according to claim 6, wherein said detection means has a light-emitting device for emitting light from the light-emitting device to a light-transmitting portion of the ink container and a photoreceptor, receives the light returning back to the photoreceptor, and detects the decrease of the residual-ink in the ink container in accordance with an amount of the received light, whose intensity varies according to the change of the ink level in the ink container.

9. The apparatus according to claim 8, wherein said detection means is a photo-reflective type sensor, a reflection board for reflecting light from the light-emitting device is provided within the ink container, and the photoreceptor receives the light reflected by the reflection board through the light-transmitting portion of the ink container.

10. The apparatus according to claim 8, further comprising print control means for controlling printing by the printhead, in accordance with the result detected by said detection means.

11. The apparatus according to claim 10, wherein said print control means includes evaluation means for evaluating an ink-discharge amount in printing by the printhead, and wherein if it is determined that the ink is exhausted, said print control means stops the printing by the printhead, in accordance with the result of evaluation of said evaluation means.

12. The apparatus according to claim 10, wherein if it is determined from the result detected by said detection means that the ink is exhausted, at a first time, said print control means performs first print operation, but if it is determined from the result detected by said detection means that the ink remains, at a second time, said print control means performs a second print operation.

13. The apparatus according to claim 12, further comprising detection control means for, after a predetermined period from the first time, controlling said detection means to detect the change of the ink level in the ink container again.

14. The apparatus according to claim 12, further comprising detection control means for, at a predetermined time, after the first time, controlling said detection means to detect the change of the ink level in the ink container again.

15. The apparatus according to claim 12, wherein it might be determined by said detection means that there is residual ink due to the fact that the photoreceptor receives unexpected incoming sunlight at the first time, and said detection means performs the ink level detection reflecting the amount of residual ink in the ink container since the photoreceptor does not receive the sunlight at the second time, by change of an incident angle of the sunlight.

16. The apparatus according to claim 12, wherein said print control means includes:

evaluation means for evaluating an ink-discharge amount in printing by said printhead; and comparison means for comparing the result of evaluation by said evaluation means with a predetermined threshold value, and wherein if it is determined that the ink is exhausted, said print control means continues or stops the printing by the printhead, in accordance with the result of comparison by said comparison means.

17. The apparatus according to claim 6, wherein the print head is a print head for discharging ink by utilizing thermal energy, and includes thermal energy transducers for generating thermal energy to be applied to the ink.

18. The apparatus according to claim 6, further comprising:

suction means for sucking the ink in the printhead;

evaluation means for evaluating an ink-discharge amount in printing by said printhead; and print control means for, after it is determined that the ink is exhausted, stopping the printing by the printhead, in accordance with the ink-discharge amount evaluated by said evaluation means and an ink-consumption amount in suction by said suction means.

19. The apparatus according to claim 18, further comprising accumulation means for accumulating the ink-discharge amount in printing and the ink-consumption amount in the suction after it is determined that the ink is exhausted.

20. The apparatus according to claim 19, wherein said print control means includes:

first comparison means for comparing an accumulated ink-discharge amount accumulated by said accumulation means with a first threshold value, immediately after the printing; and second comparison means for comparing an accumulated ink-consumption amount accumulated by said accumulation means with a second threshold value, immediately after the suction.

21. The apparatus according to claim 20, wherein the first threshold value is less than the second threshold value.

22. The apparatus according to claim 19, further comprising:
   reset means for resetting the accumulated ink-consumption amount; and
   reset control means for controlling said reset means to reset the accumulated ink-consumption at a point where it is determined in the residual-ink detection by said detection means that the ink remains.

23. The apparatus according to claim 18, wherein the ink-discharge amount and the ink-consumption amount are respectively converted into the number of dots for discharging the ink by the printhead.

24. A facsimile apparatus using a printing apparatus which scans a printhead, discharges ink from the printhead in accordance with an image signal, and performs printing on a printing medium, including: scan means for reciprocally scanning the printhead; an ink container, containing the ink, being reciprocally scanned together with the printhead scanned by said scan means, for supplying the ink to the printhead; detection means for detecting a change of an ink level in the ink container so as to determine a decrease of residual-ink in the ink container; and timing control means for controlling detection timing of said detection means such that status detection during scanning of the printhead and the ink container can always be made on a predetermined detection condition, wherein the predetermined detection condition corresponds to a state where the ink level in the ink container is tilted due to one of accelerated motion or decelerated motion in scanning of the printhead and the ink container, comprising:
   communication means for performing transmission and reception of an image signal via a communication line; and
   memory means for temporarily storing the image signal.

25. The facsimile apparatus according to claim 24, further comprising:
   print control means for controlling the printing by the printhead;
   evaluation means for evaluating an ink-discharge amount in printing by the printhead; and
   memory control means for, if it is determined that the ink is exhausted, for stopping the printing by the printhead in accordance with the result of evaluation by said evaluation means, and storing the image signal into said memory means.

26. A facsimile apparatus using a printing apparatus which scans a printhead, discharges ink from the printhead in accordance with an image signal, and performs printing on a printing medium, including: scan means for reciprocally scanning the printhead; an ink container, containing the ink, being reciprocally scanned together with the print head by said scan means, for supplying the ink to the printhead; detection means for detecting a change of an ink level in the ink container so as to determine a decrease of residual-ink in the ink container; timing control means for controlling detection timing of said detection means such that status detection during scanning of the printhead and the ink container can always be made on a predetermined detection condition, wherein the predetermined detection condition corresponds to a state where the ink level in the ink container is tilted due to one of accelerated motion or decelerated motion in scanning of the printhead and the ink container; and print control means for controlling printing by the printhead, in accordance with the result detected by said detection means, wherein if it is determined from the result detected by said detection means that the ink is exhausted, at a first time, said print control means performs a first print operation, but if it is determined from the result detected by said detection means that the ink remains, at a second time, said print control means performs a second print operation, comprising:
   communication means for performing transmission and reception of an image signal via a communication line; and
   memory means for temporarily storing the image signal.

27. The facsimile apparatus according to claim 26, wherein said print control means includes:
   evaluation means for evaluating an ink-discharge amount in printing by the printhead; and
   comparison means for comparing the result of evaluation by said evaluation means with a predetermined threshold value.

28. The facsimile apparatus according to claim 27, further comprising memory control means for, if it is determined that the ink is exhausted, stopping the printing by the printhead in accordance with the result of comparison by said comparison means, and storing the image signal into said memory means.

29. A printing apparatus which performs printing on a printing medium by discharging ink from a printhead by using the ink supplied from an ink tank containing the ink, comprising:
   detection means, including a photosensor having a light-emitting device and a photoreceptor, for emitting light from the light-emitting device to a light-transmitting portion of the ink tank, receiving the light returning back to the photoreceptor and detecting a status as to whether or not the ink in the ink tank is exhausted in accordance with an amount of the light received by the photoreceptor, whose intensity varies according to an ink level in the ink tank;
   suction means for sucking the ink in the printhead;
   evaluation means for evaluating an ink-discharge amount in printing by said printhead;
   print control means for, after it is determined from the status detected by said detection means that the ink is exhausted, determining when to stop the printing by the printhead in accordance with the ink-discharge amount evaluated by said evaluation means and an ink-consumption amount in suction by said suction means; and
   accumulation means for accumulating the ink-discharge amount in printing and the ink-consumption amount in the suction after it is determined from the status detected by said detection means that the ink is exhausted,
   wherein said print control means differentiates between cases for a threshold for determining when to stop the printing, a first case being where the ink is exhausted for the printing and a second case being where the ink is exhausted for the suction by said suction means.

30. The apparatus according to claim 29, wherein said print control means includes:
   first comparison means for comparing an accumulated ink-discharge amount accumulated by said accumulation means with a first threshold value, immediately after the printing; and second comparison means for comparing an accumulated ink-consumption amount accumulated by said accumulation means with a second threshold value, immediately after the suction.

31. The apparatus according to claim 29, further comprising:

reset means for resetting the accumulated ink-consumption amount; and reset control means for controlling said reset means to reset the accumulated ink-consumption and a point where it is determined from the status detected by said detection means that the ink remains.

32. The apparatus according to claim 30, wherein the first threshold value is less than the second threshold value.

33. The apparatus according to claim 29, wherein the ink-discharge amount and the ink-consumption amount are respectively converted into the number of dots for discharging the ink by the printhead.

34. The apparatus according to claim 29, further comprising:

scan means for integrally scanning the printhead and the ink tank; and timing control means for controlling detection timing of said detection means such that the status detection during scanning of the printhead and the ink tank can always be made on a predetermined detection condition.

35. The apparatus according to claim 34, wherein the detection condition is the detection timing of the status detection by said detection means, corresponding to one of stationary state, accelerated motion, decelerated motion, or uniform motion in scanning of the printhead and the ink tank.

36. The apparatus according to claim 35, wherein said detection means detects the status on all the detection conditions, stationary state, accelerated motion, decelerated motion, and uniform motion in scanning of the printhead and the ink tank, and said detection means determines a final residual-ink detection result, taking all detected results into consideration.

37. The apparatus according to claim 29, wherein said detection means includes a reflection board for reflecting light from the light-emitting device, and wherein the photosensor and the reflection board are provided such that a light-emitting direction of the light-emitting device and a reflection direction of the reflection board correspond to a scan-moving direction of the printhead and the ink tank, that a reflection surface of the reflection board is opposite to the light-emitting device, further wherein the photosensor is provided in contact with an exterior side wall of the ink tank, and the reflection board is provided in the ink tank.

38. The apparatus according to claim 29, wherein the print head is a print head for discharging ink by utilizing thermal energy, and includes thermal energy transducers for generating thermal energy to be applied to the ink.

39. A facsimile apparatus using a printing apparatus which performs printing on a printing medium by discharging ink from a printhead in accordance with an image signal, including: an ink tank for containing the ink and supplying the ink to the printhead; detection means, including a photosensor having a light-emitting device and a photoreceptor, for emitting light from the light-emitting device to a light-transmitting portion of the ink tank, receiving the light returning back to the photoreceptor and detecting a status as to whether or not the ink in the ink tank is exhausted in accordance with an amount of the light received by the photoreceptor, whose intensity varies according to an ink level in the ink tank; suction means for sucking the ink in the printhead; evaluation means for evaluating an ink-discharge amount in printing by said printhead; print control means for, after it is determined from the status detected by said detection means that the ink is exhausted, determining when to stop the printing by the printhead in accordance with the ink-discharge amount evaluated by said evaluation means and an ink-consumption amount in suction by said suction means; and accumulation means for accumulating the ink-discharge amount in printing and the ink-consumption amount in the suction after it is determined from the status detected by said detection means that the ink is exhausted, comprising:

communication means for performing transmission and reception of the image signal via a communication line; and memory means for temporarily storing the image signal, wherein said print control means differentiates between cases for a threshold for determining when to stop the printing, a first case being where the ink is exhausted for the printing and a second case being where the ink is exhausted for the suction by said suction means.

40. A facsimile apparatus using a printing apparatus which scans a printhead, discharges ink from the printhead, and performs printing on a printing medium, including: an ink container, being scanned by said scan means, for supplying the ink to the printhead; detection means for detecting a change of an ink level in the ink container so as to determine a decrease of residual-ink in the ink container; calculation means for calculating an amount of ink consumed by the printhead; exchange detection means for detecting an exchange of the ink container; and control means for, after it is detected by said detection means that the ink level in the ink container is lower than a predetermined level, causing said calculation means to calculate the amount of ink consumed by the printhead, and, when the amount of ink consumed by the printhead reaches a predetermined amount, controlling such that printing by the printhead is suppressed, wherein if it is detected by said exchange detection means that the ink container has been exchanged during calculating the amount of ink consumed by the ink container, said control means controls to halt the calculation bt said calculation means, comprising:

communication means for performing transmission and reception of an image signal via a communication line; and memory means for temporarily storing the image signal.

41. The facsimile apparatus according to claim 40, wherein the control means includes comparison means for comparing the result of calculation by said calculation means with a predetermined threshold value.

42. The apparatus according to claim 41, further comprising print control means for, if it is determined that the ink is exhausted, stopping the printing by the printhead in accordance with the result of comparison by said comparison means, and storing the image signal into said memory means.

43. A printing apparatus which scans a printhead, discharges ink from the printhead, and performs printing on a printing medium, comprising:

an ink container, being scanned by said scan means, for supplying the ink to the printhead;

detection means for detecting a change of an ink level in the ink container so as to determine a decrease of residual-ink in the ink container;

calculation means for calculating an amount of ink consumed by the printhead;

exchange detection means for detecting an exchange of the ink container; and control means for, after it is detected by said detection means that the ink level in the ink container is lower than a predetermined level, causing said calculation means to calculate the amount of ink consumed by the printhead, and, when the amount of ink consumed by the printhead reaches a predetermined amount, controlling such that printing by the printhead is suppressed, wherein if it is detected by said exchange detection means that the ink container has been exchanged during calculating the amount of ink consumed by the ink container, said control means controls to halt the calculation by said calculation means.

44. The apparatus according to claim 43, further comprising detection control means for, after a predetermined period has elapsed after it is detected by said detection means that the ink level is lower than the predetermined level, controlling said detection means to detect the change of the ink level in the in container again.

45. The apparatus according to claim 43, further comprising detection control means for, at a predetermined period, after it is detected by said detection means that the ink level is lower than the predetermined level, controlling said detection means to detect the change of the ink level in the ink container again.

46. The apparatus according to claim 43, wherein said detection means includes a photosensor having a light-emitting device and a photoreceptor, and a reflection board for reflecting light from the photosensor, wherein the photosensor and the reflection board are provided such that a light-emitting direction of the light-emitting device and a reflection direction of the reflection board correspond to a scan-moving direction of the printhead and the ink container, and that a reflection surface of the reflection board is opposite to the light-emitting direction, and wherein the photosensor is provided in contact with a side wall of the ink container, and the reflection board is provided in the ink container.

47. The apparatus according to claim 43, wherein said control means includes comparison means for comparing the result of calculation by said calculation means with a predetermined threshold value, and wherein if it is determined that the ink is exhausted, said control means continues or stops the printing by the printhead, in accordance with the result of comparison by said comparison means.

48. The printing apparatus according to claim 43, wherein the print head is a print head for discharging ink by utilizing thermal energy, and includes thermal energy transducers for generating thermal energy to be applied to the ink.

* * * * *